US012736902B2

(12) United States Patent
Hase et al.

(10) Patent No.: US 12,736,902 B2
(45) Date of Patent: Sep. 15, 2026

(54) IMAGE FORMING APPARATUS

(71) Applicants: Takamasa Hase, Kanagawa (JP); Arinobu Yoshiura, Kanagawa (JP); Daisuke Inoue, Kanagawa (JP); Shogo Nakamoto, Kanagawa (JP)

(72) Inventors: Takamasa Hase, Kanagawa (JP); Arinobu Yoshiura, Kanagawa (JP); Daisuke Inoue, Kanagawa (JP); Shogo Nakamoto, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 19/017,854

(22) Filed: Jan. 13, 2025

(65) Prior Publication Data

US 2025/0237979 A1 Jul. 24, 2025

(30) Foreign Application Priority Data

Jan. 22, 2024 (JP) ................................ 2024-007489

(51) Int. Cl.

| | |
|---|---|
| ***G03G 15/20*** | (2006.01) |
| ***G03G 15/00*** | (2006.01) |
| ***G03G 15/01*** | (2006.01) |

(52) U.S. Cl.

CPC ..... *G03G 15/2039* (2013.01); *G03G 15/0189* (2013.01); *G03G 15/2064* (2013.01); (Continued)

(58) Field of Classification Search

CPC ............. G03G 15/2039; G03G 15/205; G03G 15/2053; G03G 2215/2035; G03G 15/2042

See application file for complete search history.

(56) References Cited

U.S. PATENT DOCUMENTS

2009/0196644 A1* 8/2009 Funatsu ............. G03G 15/5062 399/69
2013/0209119 A1* 8/2013 Yuasa .................. G03G 15/205 399/329

(Continued)

FOREIGN PATENT DOCUMENTS

JP H01-131588 A 5/1989
JP 2006-003679 A 1/2006

(Continued)

OTHER PUBLICATIONS

Extended European Search Report issued May 7, 2025 in European Patent Application No. 25150105.2, 9 pages.

*Primary Examiner* — Jessica L Eley
(74) *Attorney, Agent, or Firm* — XSENSUS LLP

(57) ABSTRACT

An image forming apparatus includes an image forming section, a fixing device, and circuitry. The image forming section forms one or more toner images of one or more toners on a recording medium. The fixing device heats the one or more toner images and the recording medium based on a target fixing temperature. The circuitry is configured to receive a print job, determine a maximum toner overlapping ratio of the one or more toner images on a page in the print job, determine the target fixing temperature of the fixing device in accordance with the maximum toner overlapping ratio on the page, control the image forming section to form the one or more toner images, and control the fixing device to heat and fix the one or more toner images on the recording medium at the target fixing temperature.

19 Claims, 13 Drawing Sheets

(52) U.S. Cl.
CPC .................... *G03G 15/5029* (2013.01); *G03G 2215/00734* (2013.01); *G03G 2215/00738* (2013.01)

(56) References Cited

U.S. PATENT DOCUMENTS

| | | | | |
|---|---|---|---|---|
| 2018/0067427 | A1* | 3/2018 | Obayashi | G03G 15/2039 |
| 2018/0217541 | A1* | 8/2018 | Nomura | G03G 15/2039 |
| 2021/0197585 | A1 | 7/2021 | Hase et al. | |
| 2021/0373469 | A1* | 12/2021 | Shinji | G03G 15/2039 |

FOREIGN PATENT DOCUMENTS

| | | | |
|---|---|---|---|
| JP | 2016-212339 | A | 12/2016 |
| JP | 2022-057608 | A | 4/2022 |

* cited by examiner

IMAGE AREA RATE : 20%

IMAGE AREA RATE : 50%

IMAGE AREA RATE : 100%

IMAGE AREA RATE : 100%

IMAGE FORMING APPARATUS

CROSS-REFERENCE TO RELATED APPLICATIONS

This patent application is based on and claims priority pursuant to 35 U.S.C. § 119(a) to Japanese Patent Application No. 2024-007489, filed on Jan. 22, 2024, in the Japan Patent Office, the entire disclosure of which is hereby incorporated by reference herein.

BACKGROUND

Technical Field

Embodiments of the present disclosure relate to an image forming apparatus.

Related Art

A fixing target temperature in a fixing device of an image forming apparatus known in the art is determined based on the largest toner overlapping ratio and the largest image area rate, which are assumed in the design. However, the toner overlapping ratio in a typical image is smaller than the largest toner overlapping ratio. The image area rate in the typical image is also smaller than the largest image area rate. As a result, the fixing target temperature is higher than the fixing temperature to fix the typical image onto a sheet, and the image forming apparatus known in the art has much room to improve quality such as energy saving performance, paper curling, generation of fine particles, and the life of the fixing device.

SUMMARY

The present disclosure described herein provides the image forming apparatus including an image forming section, a fixing device, and circuitry. The image forming section forms one or more toner images of one or more toners on a recording medium. The fixing device heats the one or more toner images and the recording medium based on a target fixing temperature and fixes the one or more toner images onto the recording medium. The circuitry is configured to receive a print job, determine a maximum toner overlapping ratio of the one or more toner images on a page in the print job, determine the target fixing temperature of the fixing device in accordance with the maximum toner overlapping ratio on the page, control the image forming section to form the one or more toner images, and control the fixing device to heat and fix the one or more toner images on the recording medium at the target fixing temperature.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1A:
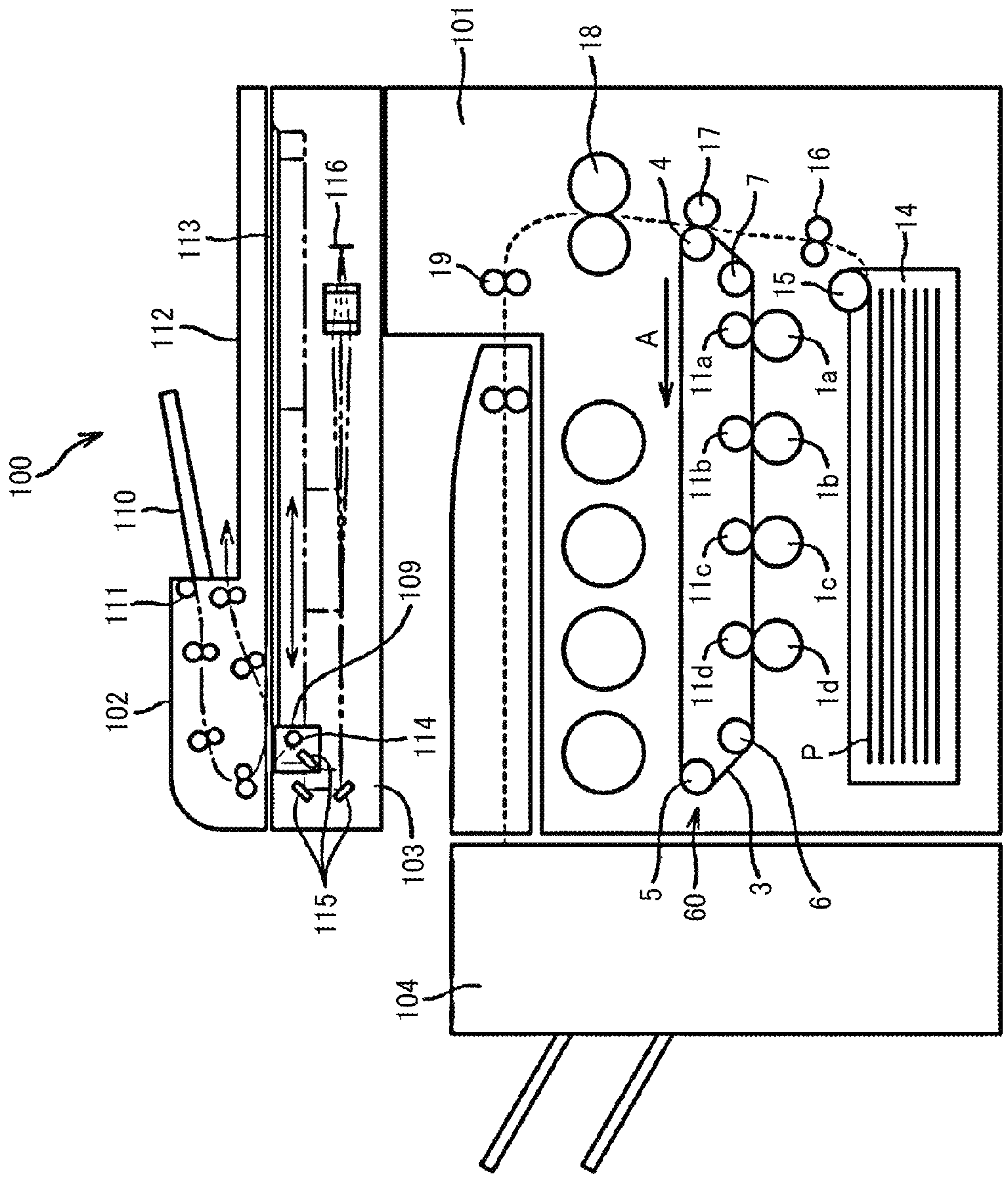
FIG. 1A is a schematic diagram illustrating a configuration of an image forming apparatus.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a,” “an,” and “the” are intended to include the plural forms as well, unless the context clearly indicates otherwise.

Embodiments of the present disclosure are described below in detail with reference to the drawings. Like reference signs are assigned to identical or equivalent components and a description of those components may be simplified or omitted.

Figure 1B:
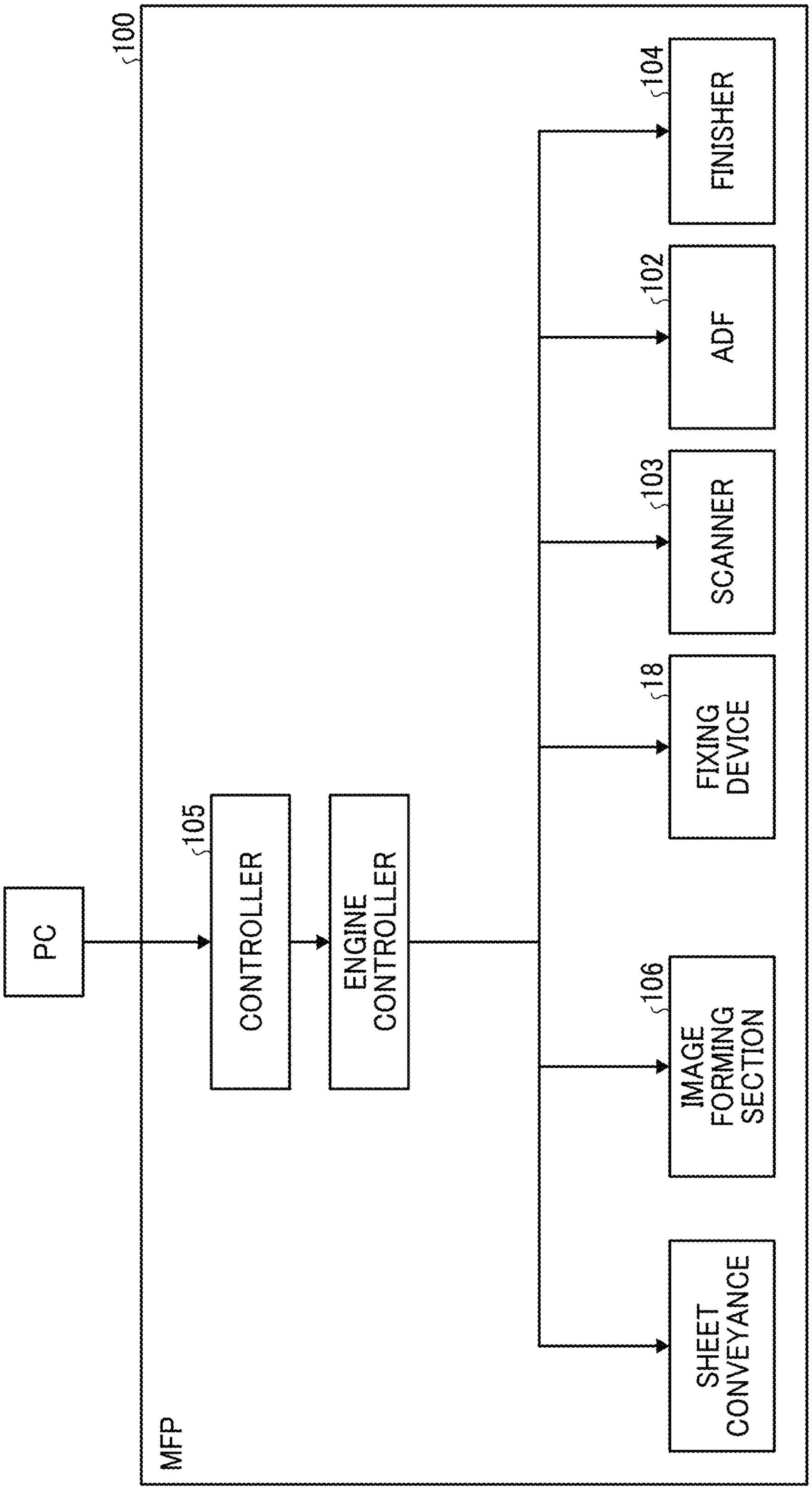
FIG. 1B is a block diagram of the image forming apparatus of FIG. 1A.

As an example of an image forming apparatus, an electrophotographic image forming apparatus 100 is described below. FIG. 1A is a schematic diagram illustrating a configuration of the image forming apparatus 100. FIG. 1B is a block diagram of the image forming apparatus 100. The image forming apparatus 100 includes a main body 101, an automatic document feeder (ADF) 102, a scanner 103 as an image reading device, and a post-processing apparatus such as a finisher 104. The main body 101 and the scanner 103 may be integrally formed or may be separately formed.

The image forming apparatus 100 includes an operation panel. The operation panel allows a user to change paper settings, copy image quality, and scanner settings. As illustrated in FIG. 1B, the image forming apparatus 100 can receive and print a print job transmitted from an external apparatus such as a personal computer.

As illustrated in FIG. 1B, the image forming apparatus 100 includes a controller 105 as circuitry including an engine controller, a sheet conveyance section, an image forming section 106, a fixing device 18, the scanner 103, the ADF 102, and a finisher 104. The controller sends signals to various parts to execute printing in accordance with a print mode set by a printer driver. As illustrated in FIG. 1A, the ADF 102 includes a document feed tray 110 to set a document, a pickup roller 111 that picks up the document from the document feed tray 110, and a sheet ejection tray 112 to which the document is ejected.

The scanner 103 includes a carriage 109 movable in a horizontal direction indicated by a double-headed arrow as illustrated in FIG. 1A, a light source 114 such as a light-emitting diode (LED) that is in the carriage 109 and irradiates the document with light through a platen 113, multiple reflection mirrors 115, a photoelectric conversion element (a charge-coupled device (CCD) sensor) 116 that receives light from the document and converts the light into electrical signals, and an A/D converter that converts the electrical signals into digital data. The finisher 104 has a stapler function, a punching function, and a sheet folding function as post-processing for sheets on which images have been formed. The sheets may be referred to as recording sheets.

The stapler can bind sheets ejected from the main body 101 in a predetermined number of sheets in accordance with instructions included in the print job data. A punch can punch a hole at a predetermined position on a sheet or a predetermined number of sheets ejected from the image forming apparatus 100 in accordance with instructions included in the print job data.

The image forming section 106 in the main body 101 forms a toner image on a sheet P and includes four (first to fourth) photoconductors 1*a* to 1*d* as image bearers. The image forming section 106 in the main body 101 includes an intermediate transfer device 60 that is a belt device including an intermediate transfer belt 3 as a belt above the four photoconductors 1*a* to 1*d*.

Different color toner images are formed on the four photoconductors 1*a* to 1*d*.

Black toner images, cyan toner images, magenta toner images, and yellow toner images are formed on the four photoconductors 1*a*, 1*b*, 1*c*, and 1*d*, respectively. The photoconductors 1*a*, 1*b*, 1*c*, and 1*d* in FIG. 1A are drum-shaped photoconductors but may be photoconductor belts each having an endless belt shape, being wound around multiple rollers, and being driven to rotate by a driving roller.

The intermediate transfer belt 3 as an intermediate transferor is disposed facing the four photoconductors 1*a*, 1*b*, 1*c*, and 1*d* (to be more specific, the first photoconductor 1*a*, the second photoconductor 1*b*, the third photoconductor 1*c*, and the fourth photoconductor 1*d*). In FIG. 1A, the four photoconductors 1*a*, 1*b*, 1*c*, and 1*d* are in contact with the surface of the intermediate transfer belt 3. The intermediate transfer belt 3 illustrated in FIG. 1A is wound around support rollers, which are a secondary transfer facing roller 4, a tension roller 5, a backup roller 6, and an entrance roller 7. The secondary transfer facing roller 4 that functions as one of the support rollers is a drive roller that is driven by a driver. As the secondary transfer facing roller 4 rotates, the intermediate transfer belt 3 is rotated in a direction indicated by the arrow A in FIG. 1A.

The intermediate transfer belt 3 may have either a multi-layer structure or a single-layer structure. The multiple layers preferably include a base layer having an outer circumferential surface coated by a smooth coating layer made of, e.g., fluorine-based resin. The base layer may be made of, for example, a stretch-resistant fluororesin, polyvinylidene difluoride (PVDF) sheet, or polyimide resin. The single layer may be preferably made of, for example, PVDF, polycarbonate (PC), or polyimide.

Regardless of the color of toner, the configuration and operation to form toner images on the four photoconductors 1*a*, 1*b*, 1*c*, and 1*d* are similar. Similarly, the configuration and operation to transfer the toner images onto the intermediate transfer belt 3 are similar regardless of the color of toner. Accordingly, a description is given of how a yellow toner image is formed on the photoconductor 1*d* for forming the yellow toner image out of the four photoconductors 1*a*, 1*b*, 1*c*, and 1*d* and how the yellow toner image is transferred from the photoconductor 1*d*, which is disposed most upstream in a belt surface moving direction of the intermediate transfer belt 3, to the intermediate transfer belt 3. Descriptions of the configuration and operation regarding the photoconductors 1*a*, 1*b*, and 1*c* forming other toner color images (the cyan toner image, the magenta toner image, and the black toner image) are omitted to avoid redundancy.

The photoconductor 1*d* for forming the yellow toner image rotates clockwise in FIG. 1A. As the photoconductor 1*d* is rotated, the surface of the photoconductor 1*d* is irradiated with light from a static eliminator. Consequently, the surface potential of the photoconductor 1*d* is initialized. The photoconductor 1*d* is further rotated and reaches a position where the photoconductor 1*d* faces a charging device, and the charging device uniformly charges the initialized outer circumferential surface of the photoconductor 1*d* to a given polarity (in the present embodiment, to a negative polarity).

An exposure device emits an optically modulated laser beam onto the charged outer circumferential surface of the photoconductor 1*d* for forming the yellow toner image to form an electrostatic latent image corresponding to image data on the surface of the photoconductor 1*d*. In the image forming apparatus 100 of FIG. 1A, the exposure device as a laser writer emits the laser beam. Alternatively, the exposure device may include a light-emitting diode (LED) array and an imaging device.

The electrostatic latent image formed on the photoconductor 1*d* is visualized as a visible yellow toner image by a developing device for yellow. On the other hand, a primary transfer roller 11*d* for yellow is disposed inside a loop formed by the intermediate transfer belt 3. The primary transfer roller 11*d* is opposite to the photoconductor 1*d* via the intermediate transfer belt 3.

The primary transfer roller 11*d* is brought into contact with the back face of the intermediate transfer belt 3, forming a transfer nip between the photoconductor 1*d* and the intermediate transfer belt 3 properly. A primary transfer bias is applied to the primary transfer roller 11*d*. The primary transfer bias has a positive polarity in the present embodiment, which is opposite a toner charging polarity of toner contained in the yellow toner image formed on the surface of the photoconductor 1*d*.

Thus, a transfer electrical field is generated between the photoconductor 1*d* and the intermediate transfer belt 3. The yellow toner image on the photoconductor 1*d* is electrostatically transferred onto the intermediate transfer belt 3 that is rotated in synchronization with the photoconductor 1*d*. After the yellow toner image is transferred onto the intermediate transfer belt 3, a cleaning device for yellow removes the residual toner remaining on the surface of the photoconductor 1*d* to clean the surface of the photoconductor 1*d*.

Similarly, a black toner image, a cyan toner image, and a magenta toner image are formed on the other three photoconductors 1*a*, 1*b*, and 1*c*, respectively, and the toner images of respective colors are sequentially superimposed and electrostatically transferred one after another on the yellow toner image on the intermediate transfer belt 3 by primary transfer rollers 11*a*, 11*b*, and 11*c*.

The image forming apparatus 100 has two types of drive modes, which are a full-color mode in which four color toners are used and a monochrome mode in which black toner alone is used. In the full-color mode, the intermediate transfer belt 3 and each of the four photoconductors 1*a*, 1*b*, 1*c*, and 1*d* come into contact with each other, and the four color toner images are transferred onto the intermediate transfer belt 3.

By contrast, in the monochrome mode, the photoconductor 1*a* alone contacts the intermediate transfer belt 3, so that the black toner alone is transferred to the intermediate transfer belt 3. At this time, the three photoconductors 1*b*, 1*c*, and 1*d* for the cyan toner image, the magenta toner image, and the yellow toner image are not in contact with the intermediate transfer belt 3, and a contact-separation mechanism separates the three primary transfer rollers 11*b*, 11*c*, and 11*d* from the three photoconductors 1*b*, 1*c*, and 1*d*. In order to reliably separate the intermediate transfer belt 3 from the three photoconductors 1*b*, 1*c*, and 1*d* for the cyan toner image, the magenta toner image, and the yellow toner image, the backup roller 6 is moved to change the profile of the intermediate transfer belt 3.

As illustrated in FIG. 1A, the image forming apparatus 100 further includes a sheet feeding device 14 in a lower portion of the main body 101 to convey the sheet. The sheet feeding device 14 includes a sheet feed roller 15. As the sheet feed roller 15 rotates, the sheet P as a recording medium is fed upward in FIG. 1A. The sheet P fed from the sheet feeding device 14 contacts a pair of registration rollers 16 for a sheet conveyance and stops temporarily.

A portion of the intermediate transfer belt 3 is wound around the secondary transfer facing roller 4. The portion of the intermediate transfer belt 3 contacts a secondary transfer roller 17 that functions as a secondary transferor disposed facing the secondary transfer facing roller 4. The portion of the intermediate transfer belt 3 contacting the secondary transfer roller 17 forms a secondary transfer nip.

The sheet P that has contacted the pair of registration rollers 16 is conveyed to the secondary transfer nip at a given timing. At this time, a given transfer voltage is applied to the secondary transfer roller 17, so that a composite toner image formed by overlaying the single color toner images that are one or more toner images on the intermediate transfer belt 3 is secondarily transferred onto the sheet P.

The sheet P onto which the composite toner image is secondarily transferred is further conveyed upward in the image forming apparatus 100 to pass the fixing device 18. While the sheet P passes through the fixing device 18, the composite toner image on the sheet P is fixed to the sheet P by application of heat and pressure in the fixing device 18.

The sheet P that has passed through the fixing device 18 is ejected to the outside of the image forming apparatus 100 by a pair of sheet ejection rollers 19 disposed in a sheet ejection device, and the sheet P is stacked on a sheet ejection tray. After the composite toner image is secondarily transferred onto the sheet P, some toner remains as transfer residual toner on the intermediate transfer belt 3. The transfer residual toner is removed from the intermediate transfer belt 3 by a belt cleaning device.

Figure 2:
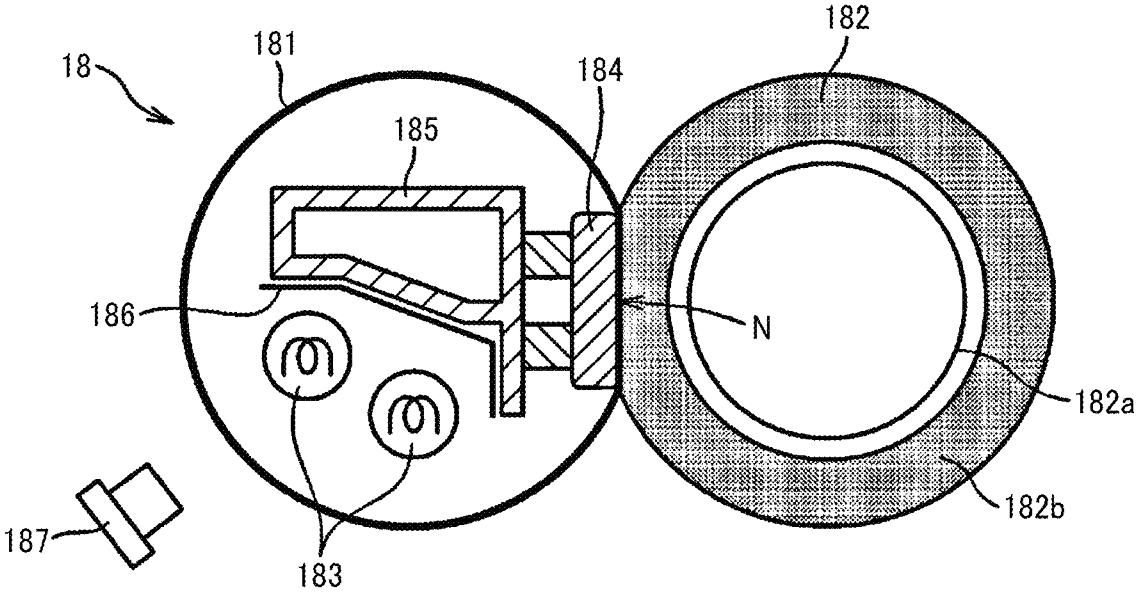
FIG. 2 is a schematic diagram illustrating a configuration of a fixing device used in the image forming apparatus of FIG. 1A.

A description is given below of the fixing device 18. FIG. 2 is a schematic diagram of the fixing device 18.

The fixing device 18 includes a fixing belt 181, a pressure roller 182, two heaters 183, and a nip forming plate 184. The fixing belt 181 is an endless belt. Each of the two heaters 183 functions as a heater to heat the fixing belt 181. The nip forming plate 184 functions as a nip forming member disposed facing the pressure roller 182 via the fixing belt 181.

The nip forming plate 184 is disposed to be in contact with an inner circumferential surface of the fixing belt 181. The fixing belt 181 is sandwiched and held between the nip forming plate 184 and the pressure roller 182 to form a fixing nip N between the pressure roller 182 and a portion of the fixing belt 181 that is the portion contacting a nip forming face of the nip forming plate 184.

The fixing belt 181 is an endless belt or film made of metal, such as nickel or steel use stainless (SUS), or resin such as polyimide. The surface layer of the fixing belt 181 includes a release layer made of perfluoroalkoxy alkane (PFA) or polytetrafluoroethylene (PTFE) to facilitate separation of toner of the toner image on the sheet from the fixing belt 181, thus preventing the toner of the toner image from adhering to the fixing belt 181.

An elastic layer made of, e.g., silicone rubber may be interposed between the base layer and the surface layer in the fixing belt 181. If the fixing belt 181 does not include the elastic layer, the fixing belt 181 has a decreased thermal capacity that enhances the fixing property. However, slight surface asperities in the fixing belt 181 may be transferred onto the toner image on the sheet S, resulting in variation in gloss of the solid toner image that may appear as an orange peel image on the sheet P.

In order to address this situation, the fixing belt 181 preferably includes the elastic layer having a thickness not smaller than 100 μm, for example. As the elastic layer deforms, the elastic layer absorbs the slight surface asperities in the fixing belt 181, thereby preventing the formation of the faulty orange peel image.

The heaters 183 are disposed opposite the inner circumferential surface of the fixing belt 181, and radiant heat radiated by the heaters 183 heats the fixing belt 181. The heaters 183 are halogen heaters. However, the type and number of heaters 183 are not fixed. In other words, the type and number of heaters 183 depend on the fixing device 18. For example, instead of the halogen heaters 183, a heater such as an induction heater (IH), a resistive heat generator, or a carbon heater may be used.

The pressure roller 182 is an elastic roller in which the periphery of a cored bar 182*a* is covered by an elastic rubber layer 182*b*. The surface layer of the pressure roller 182 has a hardness lower than the hardness of the nip forming surface of the nip forming plate 184.

The elastic rubber layer 182*b* of the pressure roller 182 may be made of solid rubber but is preferably made of sponge rubber.

The sponge rubber is preferable to the solid rubber because the sponge rubber has enhanced thermal insulation that draws less heat from the fixing belt 181 to the pressure roller 182. Further, the pressure roller 182 includes a surface release layer made of PFA or PTFE to facilitate the separation of the sheet P from the pressure roller 182.

The pressure roller 182 includes a shaft supported by a housing of the fixing device 18. A driving force is generated by a driver such as a motor in the main body 101 of the image forming apparatus 100, and gears transmit the driving force to the pressure roller 182 to drive and rotate the pressure roller 182. In the fixing nip N, the rotation driving force is transmitted from the pressure roller 182 to the fixing belt 181. Rotations of the pressure roller 182 rotate the fixing belt 181. While the fixing belt 181 rotates, holders (flanges) guide both ends of the fixing belt 181 in a portion other than the fixing nip N.

While the fixing belt 181 rotates, the inner circumferential surface of the fixing belt 181 slides on the nip forming surface of the nip forming plate 184. A slidability enhancing member such as a slide aid sheet may be interposed between the nip forming surface of the nip forming plate 184 and the inner circumferential surface of the fixing belt 181 to enhance the sliding performance of the fixing belt 181.

The nip forming plate 184 is fixed and supported on a stay 185. The stay 185 also has the function of preventing the nip forming plate 184 from being bent by pressure of the pressure roller 182 to form the fixing nip N having a uniform width in a width direction of the fixing belt 181 that is an axial direction of the pressure roller 182.

The stay 185 that receives the pressure applied by the pressure roller 182 enables obtaining a pressure in the fixing nip N to fuse and fix the toner of the toner image onto the sheet P. Holders hold and fix both ends of the stay 185 to position the stay 185.

Bending an iron plate or a stainless steel plate forms the stay 185. Since the iron plate or the stainless steel plate has a thickness of 2 to 4 mm, the stay 185 has a large thermal capacity. To prevent the large thermal capacity of the stay 185 from consuming unnecessary energy, a reflector 186 is disposed between the heaters 183 and the stay 185. The reflector 186 prevents the stay 185 from being heated by radiant heat from the heaters 183 and consuming unnecessary energy. Instead of the reflector 186, the surface of the stay 185 may be subjected to heat insulation treatment or mirror finish treatment.

The nip forming plate 184 has a substantially flat nip forming surface. Since the nip forming surface of the nip forming plate 184 has higher hardness than the hardness of the elastic rubber layer 182*b* of the pressure roller 182, the elastic rubber layer 182*b* of the pressure roller 182 elastically deforms along the nip forming surface of the nip forming plate 184.

As a result, the fixing nip N has a substantially flat face along the flat nip forming surface of the nip forming plate 184. The nip forming surface may not be completely flat. As long as the curvature is sufficiently smaller than the curvature of a known fixing nip formed by two rollers, the nip forming surface may have a slightly curved shape such as a convex shape or a concave shape.

The fixing device 18 configured as described above has a structure having a low thermal capacity around the fixing belt 181 and efficiently heats the fixing belt 181 in a short time. The image forming apparatus 100 performs a warm-up operation to raise the temperature of the fixing belt 181 to the specified fixing temperature and subsequently starts an image forming operation. Since the structure around the fixing belt 181 in the fixing device 18 has a low thermal capacity, the heaters can heat the fixing belt 181 to the specified fixing temperature in a short time, which can reduce the period of the warm-up operation that is referred to as a warm-up time.

The controller 105 determines the amount of power supplied to the heaters 183 according to a difference between a target fixing temperature and a surface temperature of the fixing belt 181 that is detected by a thermopile 187. However, at the start of printing and at the start of warm-up, a predetermined amount of power may be input to the heaters 183. The rated power of the heaters is 1200 W, and the power supply voltage is 100 V. When the power is always supplied to the heaters, a current 12 A flows, and the power consumption becomes 1200 W.

A first embodiment is described below.

In the image forming apparatus according to the first embodiment, toner is transferred to and fixed onto the recording medium to form an image. The image forming apparatus includes the controller receiving the print job, determining a maximum toner overlapping ratio on a page in the print job, and determining the target fixing temperature based on the maximum toner overlapping ratio on the page before the start of forming the image. Subsequently, the controller controls the image forming section to form one or more toner images of one or more toners and controls the fixing device to heat and fix the one or more toner images onto the sheet as the recording medium at the target fixing temperature.

Figure 3:
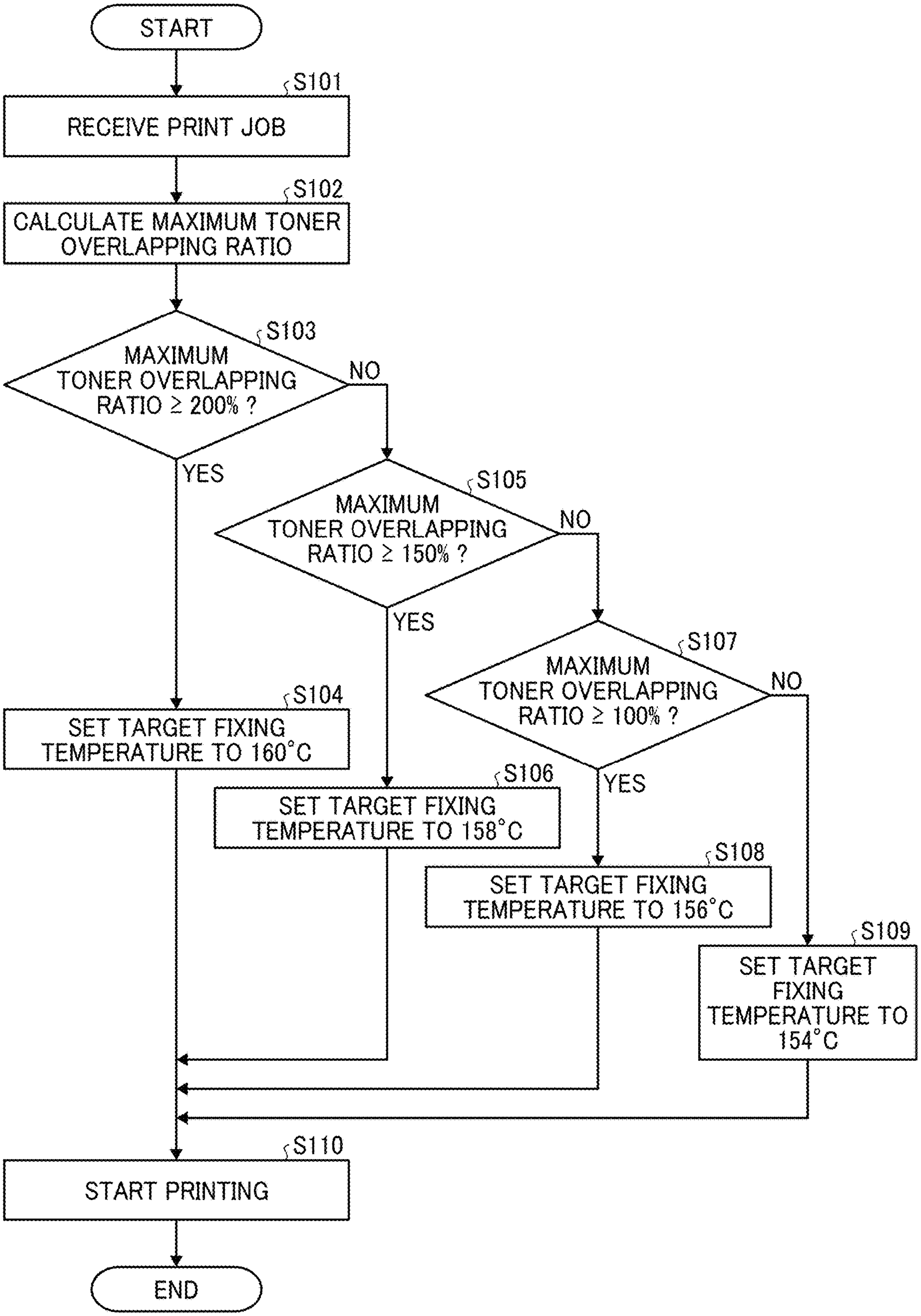
FIG. 3 is a flowchart of a control in an image forming apparatus according to a first embodiment.

FIG. 3 is a flowchart of a control in the image forming apparatus according to the first embodiment. The controller 105 in the image forming apparatus according to the first embodiment performs from step S101 to step S110 before the start of printing.

In step S101, the controller 105 receives the print job from the personal computer in FIG. 1B and reads image data to decompose the image data into cyan (C) image data, magenta (M) image data, yellow (Y) image data, and black (K) image data so that the image forming apparatus 100 in FIG. 1A can form the image.

In step S102, the controller 105 calculates the maximum toner overlapping ratio on a page based on the decomposed image data.

The toner overlapping ratio means a ratio of the total amount of the cyan, magenta, yellow, and black toners in a predetermined region. When the image is drawn in the predetermined region with any one of the cyan, magenta, yellow, and black toners without a space, the toner overlapping ratio is 100%. In the above, the predetermined region is one pixel. The pixel is a minimum unit of an image when image processing is performed on original image data and the image forming apparatus forms an image. The controller 105 calculates total amount ratios of the toner in all areas of one page and further calculates the largest toner overlapping ratio that is the largest total amount ratio on the one page. The amount of toner is a calculated value by the controller 105 and not the real weight of toner adhered to the recording medium or the real volume of the toner.

FIGS. 4A to 4F are diagrams each illustrating the toner overlapping ratio.

Figure 4A:
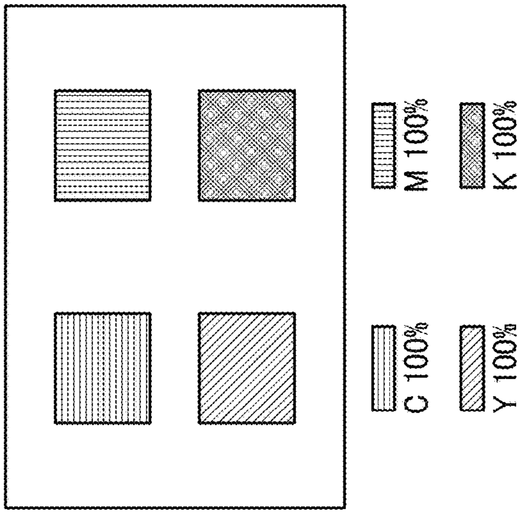
FIGS. 4A to 4F (FIG. 4) are diagrams each illustrating a toner overlapping ratio.
Figure 4B:
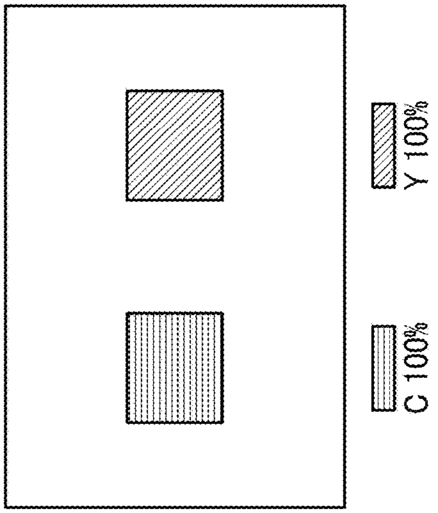

As illustrated in FIGS. 4A and 4B, if regions are independently drawn by one of the cyan toner, the magenta toner, the yellow toner, and the black toner, and if each region is drawn by one of the cyan toner, the magenta toner, the yellow toner, and the black toner without a space, the controller 105 determines that the maximum toner overlapping ratio is 100%.

Figure 4C:
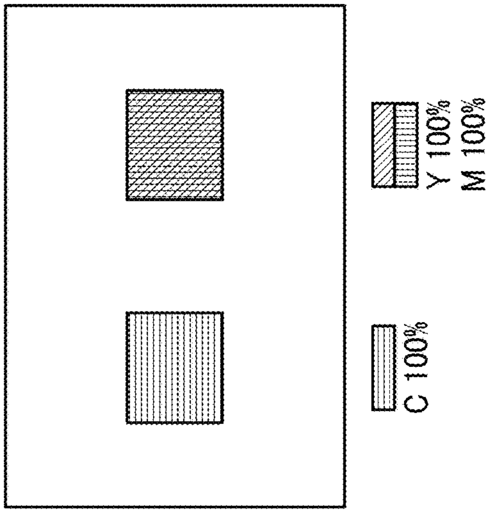

In FIG. 4C, the toner overlapping ratio in the region drawn by only the cyan toner is 100%. Since a red region is formed by overlaying a magenta region having the toner overlapping ratio of 100% on a yellow region having the toner overlapping ratio of 100%, the controller 105 calculates the toner overlapping ratio in the red region to be 200% and determines that the maximum toner overlapping ratio on the page is 200%.

Figure 4D:
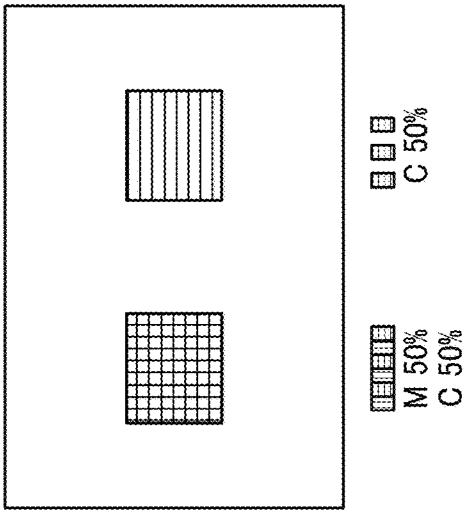

FIG. 4D illustrates an example in which two halftone images are formed on the page. One region is formed by two color toners to form one halftone image. The one region is formed by a region drawn by the cyan toner with a toner overlapping ratio of 50% and a region drawn by the magenta toner with a toner overlapping ratio of 50%. The controller 105 calculates the toner overlapping ratio of the one region to be 100%. The other region is drawn by the cyan toner and has the toner overlapping ratio of 50% to form the other halftone image. The controller calculates the toner overlapping ratio of the other region to be 50%. In this case, the controller 105 determines that the maximum toner overlapping ratio on the page is 100%.

Figure 4E:
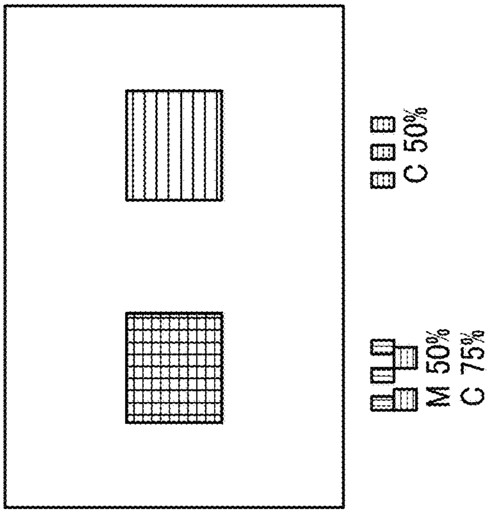

FIG. 4E illustrates another example in which two halftone images are formed on the page. One region is formed by two color toners to form one halftone image. The one region is formed by a region drawn by the cyan toner with a toner overlapping ratio of 75% and a region drawn by the magenta toner with a toner overlapping ratio of 50%. The controller 105 calculates the toner overlapping ratio of the one region to be 125%. The other region is drawn by the cyan toner and has the toner overlapping ratio of 50% to form the other halftone image. The controller calculates the toner overlapping ratio of the other region to be 50%. In this case, the controller 105 determines that the maximum toner overlapping ratio on the page is 125%.

Figure 4F:
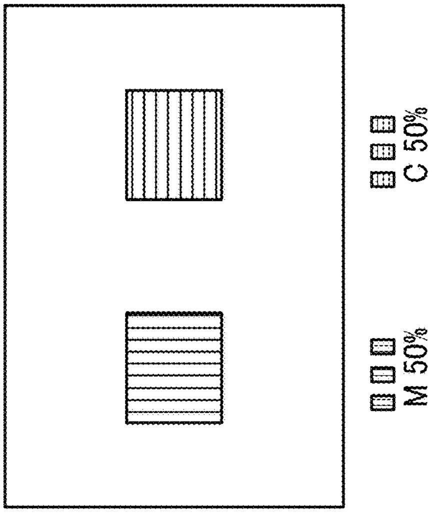

FIG. 4F illustrates still another example in which two halftone images are formed on the page. One region is formed by a region drawn by the magenta toner with the toner overlapping ratio of 50% to form one halftone image. The other region is formed by a region drawn by the cyan toner with the toner overlapping ratio of 50% to form the other halftone image. In this case, the controller 105 determines that the maximum toner overlapping ratio on the page is 50%.

In the image examples of FIGS. 4A to 4F, an outer frame represents the area of one page. The rectangular region drawn on the page is a same-color region larger than one pixel. When the color is different for each pixel, the controller 105 determines the maximum toner overlapping ratio on the page by using the same method for each pixel.

In the image forming apparatus according to the first embodiment, the controller 105 calculates the ratios of the total amounts of toners in all regions of the page. Subsequently, the controller 105 calculates the maximum toner overlapping ratio on the page that is the largest ratio of the ratios of the total amounts of toners in all regions of the one page. The above-described amount of toner and the above-described ratio of the total amount of toner are not the mass and volume of the toner actually deposited on the recording medium but are values calculated by the controller 105 in FIG. 1B.

In step S103, the controller 105 determines whether the maximum toner overlapping ratio on the page is 200% or more. As a result of the determination, if the maximum toner overlapping ratio on the page is 200% or more, the controller 105 makes the control flow proceed to step S104, and if the maximum toner overlapping ratio on the page is less than 200%, the controller makes the control flow proceed to step S105.

In step S104, the engine controller in FIG. 1B determines the target fixing temperature to be 160° C. in accordance with the maximum toner overlapping ratio of 200% or more on the page.

In step S105, the controller 105 determines whether the maximum toner overlapping ratio on the page is 150% or more. As a result of the determination, if the maximum toner overlapping ratio on the page is 150% or more, the controller 105 makes the control flow proceed to step S106, and if the maximum toner overlapping ratio on the page is less than 150%, the controller makes the control flow proceed to step S107.

In step S106, the engine controller in FIG. 1B determines the target fixing temperature to be 158° C. in accordance with the maximum toner overlapping ratio on the page that is 150% or more and less than 200%.

In step S107, the controller 105 determines whether the maximum toner overlapping ratio on the page is 100% or more and less than 150%. As a result of the determination, if the maximum toner overlapping ratio on the page is 100% or more and less than 150%, the controller 105 makes the control flow proceed to step S108, and if the maximum toner overlapping ratio on the page is less than 100%, the controller makes the control flow proceed to step S109.

In step S108, the engine controller in FIG. 1B determines the target fixing temperature to be 156° C. in accordance with the maximum toner overlapping ratio on the page that is 100% or more and less than 150%.

In step S109, the engine controller in FIG. 1B determines the target fixing temperature to be 154° C. in accordance with the maximum toner overlapping ratio on the page that is less than 100%.

In step S110, the controller 105 starts printing based on the print job received from the personal computer in FIG. 1B and controlling the amount of power supplied to the heaters 183 based on the target fixing temperature determined in any one of step S104, step S106, step S108, and step S109. In other words, the controller 105 controls the fixing device to heat and fix the image onto the sheet as the recording medium after the start of printing.

The above-described target fixing temperatures set in step S104, step S106, step S108, and step S109 are examples, and the target fixing temperature may be increased or decreased according to the maximum toner overlapping ratio. The engine controller in FIG. 1B may perform the above-described temperature control of the fixing device based on the maximum toner overlapping ratio.

When the print job includes forming images on multiple sheets, the controller 105 returns to the control in step S102 and performs the above-described steps again to fix the image onto the next sheet.

A Second embodiment is described below.

The image forming apparatus according to the second embodiment includes the controller receiving the print job, calculating an image area rate on the page in the print job, determining the maximum toner overlapping ratio on the page in the print job, and determining the target fixing temperature based on the image area rate and the maximum toner overlapping ratio on the page before the start of forming the image. Subsequently, the controller controls the image forming section to form one or more toner images of one or more toners and controls the fixing device to heat and fix the one or more toner images onto the sheet as the recording medium at the target fixing temperature.

Figure 5:
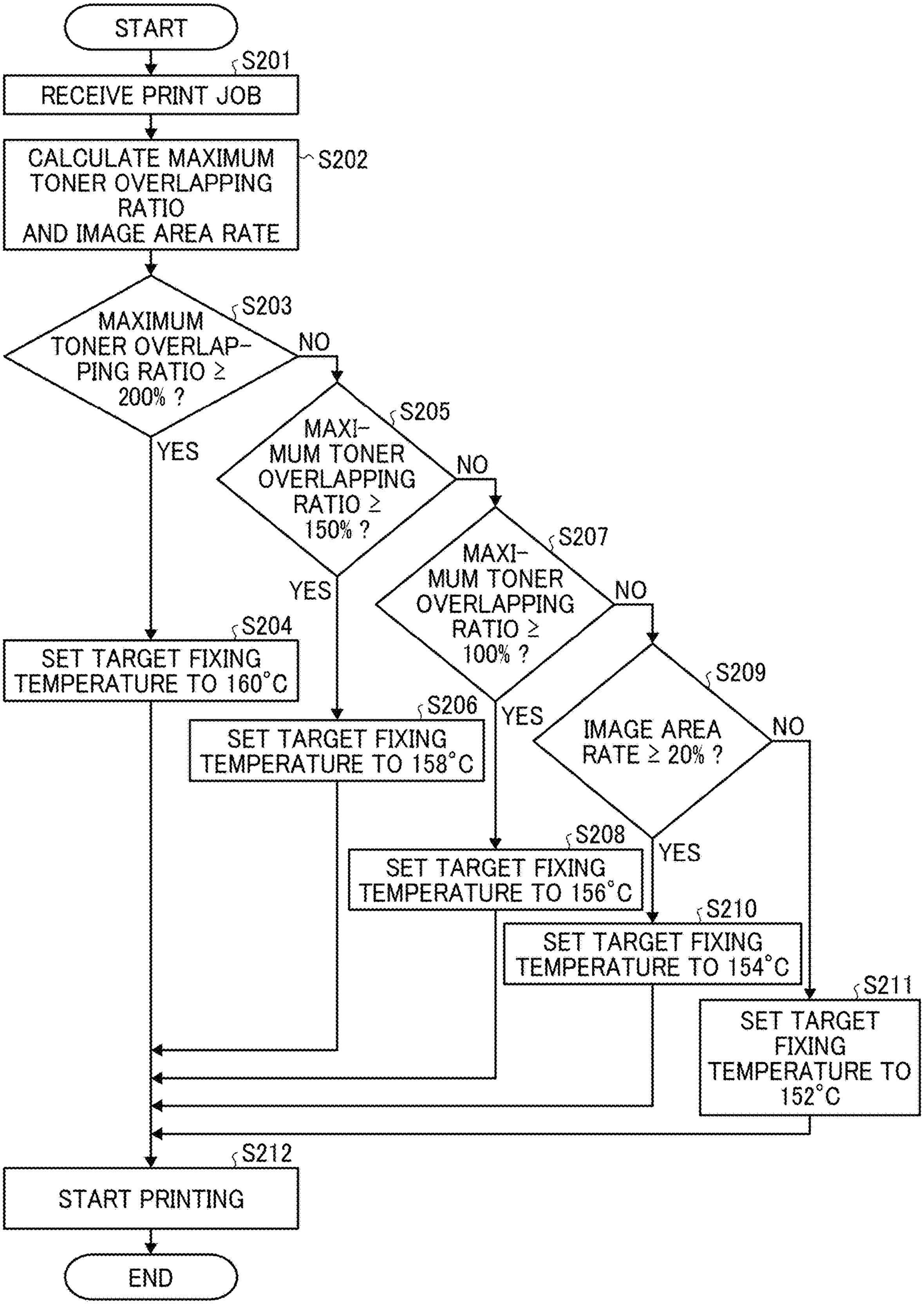
FIG. 5 is a flowchart of a control in the image forming apparatus according to a second embodiment.

FIG. 5 is a flowchart of a control in the image forming apparatus according to the second embodiment. The controller 105 in the image forming apparatus according to the second embodiment performs from step S201 to step S212 before the start of printing.

A control flow in the image forming apparatus according to the second embodiment includes determination based on the image area rate in addition to the control flow in the image forming apparatus according to the first embodiment.

The smaller the image area rate, the smaller the thermal capacity of the toner image, which reduces the amount of heat required to fix the toner image onto the recording medium. Even under a decreased target fixing temperature, heat transfer in the in-plane direction of the recording medium enables fixing the toner image onto the recording medium. The determination based on the image area rate in addition to the toner overlapping ratio enables decreasing the target fixing temperature to be smaller than the target fixing temperature in the first embodiment, which effectively enhances the energy saving performance and reduces the generation amount of the fine particles and the curling amount of the recording medium.

In a similar manner to the processes in step S101, in step S201, the controller 105 receives the print job from the personal computer in FIG. 1B and reads image data to decompose the image data into cyan (C) image data, magenta (M) image data, yellow (Y) image data, and black (K) image data so that the image forming apparatus 100 in FIG. 1A can form the image.

Figure 6A:
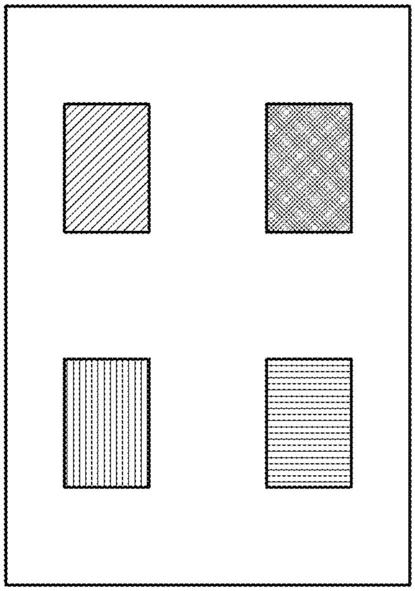
FIGS. 6A to 6D (FIG. 6) are diagrams each illustrating an image area rate on a page.
Figure 6B:
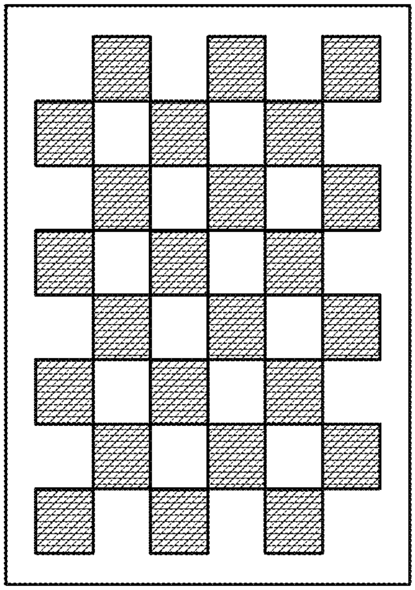
Figure 6C:
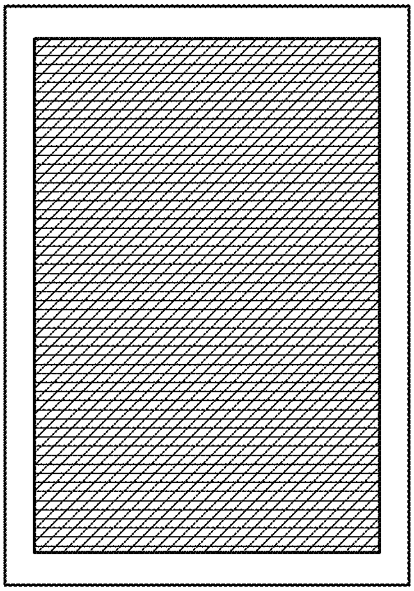
Figure 6D:
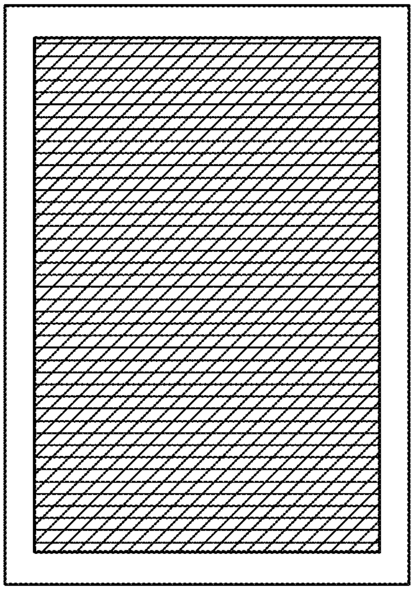

In step S202, the controller 105 calculates the maximum toner overlapping ratio and the image area rate on the page based on the decomposed image data. The image area rate means a ratio of an area where an image is formed to an area where pixels are formed in one page as illustrated in FIG. 6. In FIG. 6A, four single color images are in one page. Each single color image has an image area rate of 5%, and the total image area rate of the four single color images is 20%. In FIG. 6B, a magenta image having an image area rate of 50% overlies a yellow image having an image area rate of 50% to form a red image having an image area rate of 50%. In this case, the image area rate is 50% because the two single color images completely overlie each other. FIGS. 6C and 6D illustrate examples of halftone images having different colors. In each of these cases, although no toner image is formed on a part of the sheet, the image area rate is 100% because an image is formed on all of the area where the pixels are formed in one page. In the image examples of FIGS. 6A to 6D, the outer frame represents the area of one page.

In step S203, the controller 105 determines whether the maximum toner overlapping ratio on the page is 200% or more. As a result of the determination, if the maximum toner overlapping ratio on the page is 200% or more, the controller 105 makes the control flow proceed to step S204, and if the maximum toner overlapping ratio on the page is less than 200%, the controller makes the control flow proceed to step S205.

In step S204, the engine controller in FIG. 1B determines the target fixing temperature to be 160° C. in accordance with the maximum toner overlapping ratio of 200% or more on the page.

In step S205, the controller 105 determines whether the maximum toner overlapping ratio on the page is 150% or more and less than 200%. As a result of the determination, if the maximum toner overlapping ratio on the page is 150% or more and less than 200%, the controller 105 makes the control flow proceed to step S206, and if the maximum toner overlapping ratio on the page is less than 150%, the controller makes the control flow proceed to step S207.

In step S206, the engine controller in FIG. 1B determines the target fixing temperature to be 158° C. in accordance with the maximum toner overlapping ratio on the page that is 150% or more and less than 200%.

In step S207, the controller 105 determines whether the maximum toner overlapping ratio on the page is 100% or more and less than 150%. As a result of the determination, if the maximum toner overlapping ratio on the page is 100% or more and less than 150%, the controller 105 makes the control flow proceed to step S208, and if the maximum toner overlapping ratio on the page is less than 100%, the controller makes the control flow proceed to step S209.

In step S208, the engine controller in FIG. 1B determines the target fixing temperature to be 156° C. in accordance with the maximum toner overlapping ratio on the page that is 100% or more and less than 150%.

In step S209, the controller 105 determines whether the image area rate on the page is 20% or more. As a result of the determination, if the image area rate on the page is 20% or more, the controller 105 makes the control flow proceed to step S210, and if the image area rate on the page is less than 20%, the controller makes the control flow proceed to step S211. In step S210, the engine controller in FIG. 1B determines the target fixing temperature to be 154° C. in accordance with the image area rate on the page that is 20% or more and the maximum toner overlapping ratio on the page that is less than 100%.

In step S211, the engine controller in FIG. 1B determines the target fixing temperature to be 152° C. in accordance with the image area rate on the page that is less than 20% and the maximum toner overlapping ratio on the page that is less than 100%.

In step S212, the controller 105 starts printing based on the print job received from the personal computer in FIG. 1B and controlling the amount of power supplied to the heaters 183 based on the target fixing temperature determined in any one of step S204, step S206, step S208, step S210, and step S211. In other words, the controller 105 controls the fixing device to heat and fix the image onto the sheet as the recording medium after the start of printing.

The above-described target fixing temperatures set in step S204, step 206, step S208, step S210, and step S211 are examples, and the target fixing temperature may be increased or decreased according to the image area rate and the maximum toner overlapping ratio. The engine controller in FIG. 1B may perform the above-described temperature control of the fixing device based on the image area rate on the page and the maximum toner overlapping ratio.

When the print job includes forming images on multiple sheets, the controller 105 returns to the control in step S202 and performs the above-described steps again to fix the image onto the next sheet.

A third embodiment is described below.

The image forming apparatus according to the third embodiment includes the controller receiving the print job, calculating the minimum margin width on a page in the print job, determining the maximum toner overlapping ratio on the page in the print job, and determining the target fixing temperature based on the minimum margin width and the maximum toner overlapping ratio on the page before the start of forming the image. Subsequently, the controller controls the image forming section to form one or more toner images of one or more toners and controls the fixing device to heat and fix the one or more toner images onto the sheet as the recording medium at the target fixing temperature.

Figure 7:
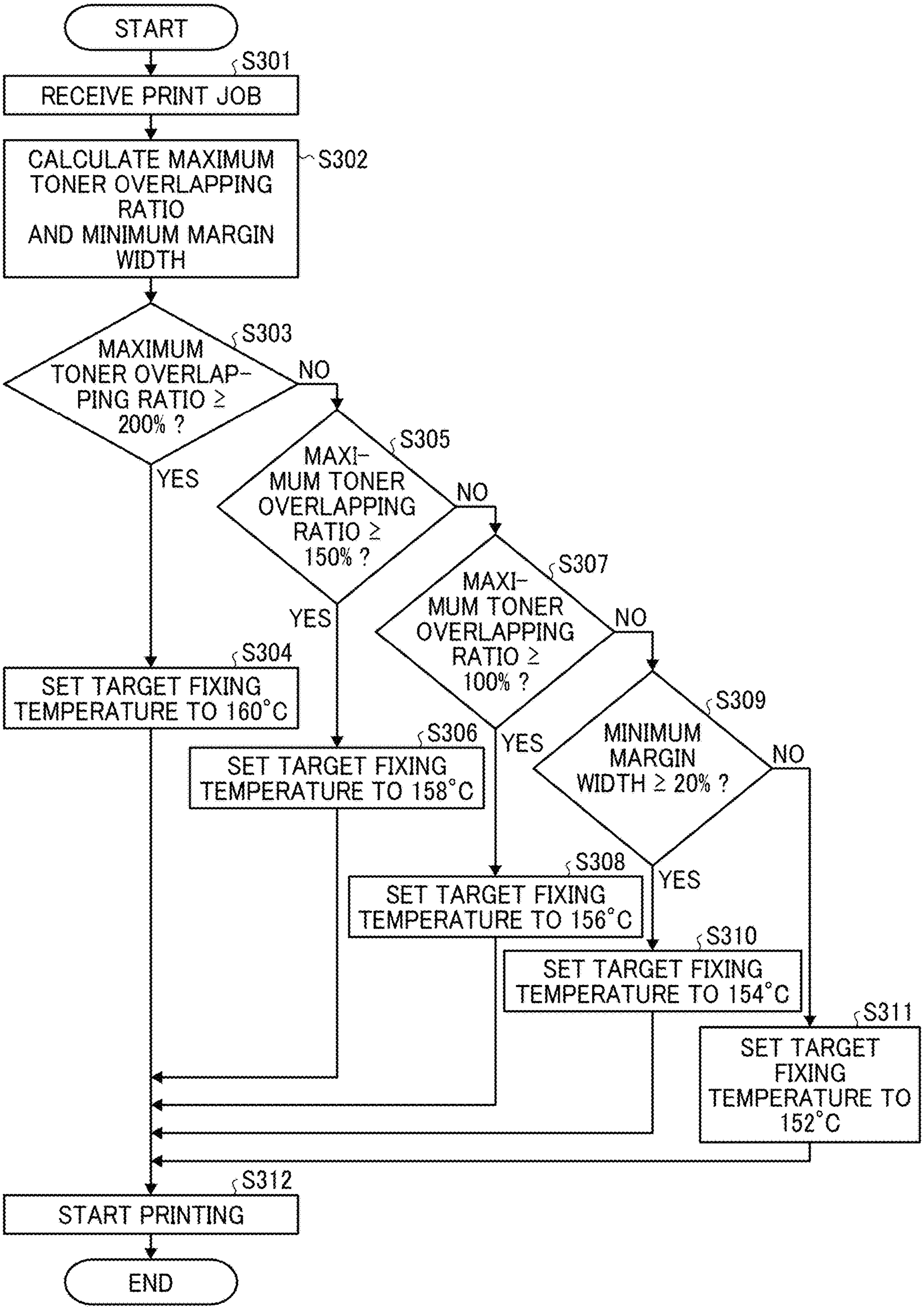
FIG. 7 is a flowchart of a control in the image forming apparatus according to a third embodiment.

FIG. 7 is a flowchart of a control in the image forming apparatus according to the third embodiment. The controller 105 in the image forming apparatus according to the third embodiment performs from step S301 to step S312 before the start of printing.

A control flow in the image forming apparatus according to the third embodiment includes determination based on the minimum margin width in addition to the control flow in the image forming apparatus according to the first embodiment.

The temperature distribution in the main scanning direction tends to have a larger deviation at the end portion, and particularly tends to decrease at the end portion when the heat storage amount of the fixing device is low.

The margin has no toner image. In the margin, heat to fix toner onto the sheet is not necessary. Even if the target fixing temperature is lowered, toner in an image area on one page having a large margin can be fixed onto the recording medium. The determination based on the margin in addition to the toner overlapping ratio enables decreasing the target fixing temperature to be smaller than the target fixing temperature in the first embodiment, which effectively enhances the energy saving performance and reduces the generation amount of the fine particles and the curling amount of the recording medium.

In a similar manner to the processes in step S101, in step S301, the controller 105 receives the print job from the personal computer in FIG. 1B and reads image data to decompose the image data into cyan (C) image data, magenta (M) image data, yellow (Y) image data, and black (K) image data so that the image forming apparatus 100 in FIG. 1A can form the image.

In step S302, the controller 105 calculates the maximum toner overlapping ratio and the minimum margin width on a page based on the decomposed image data.

Figure 8B:
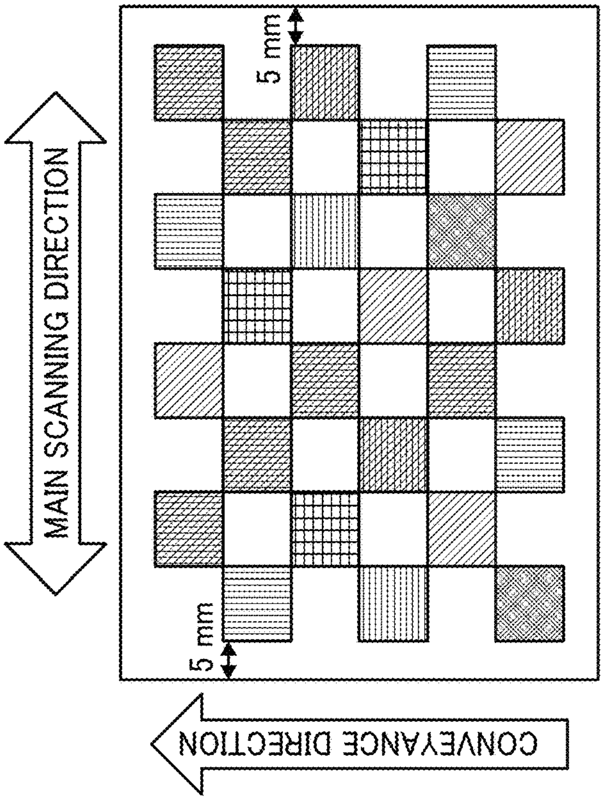
FIGS. 8A and 8B (FIG. 8) are diagrams each illustrating a minimum margin width on a page.
Figure 8A:
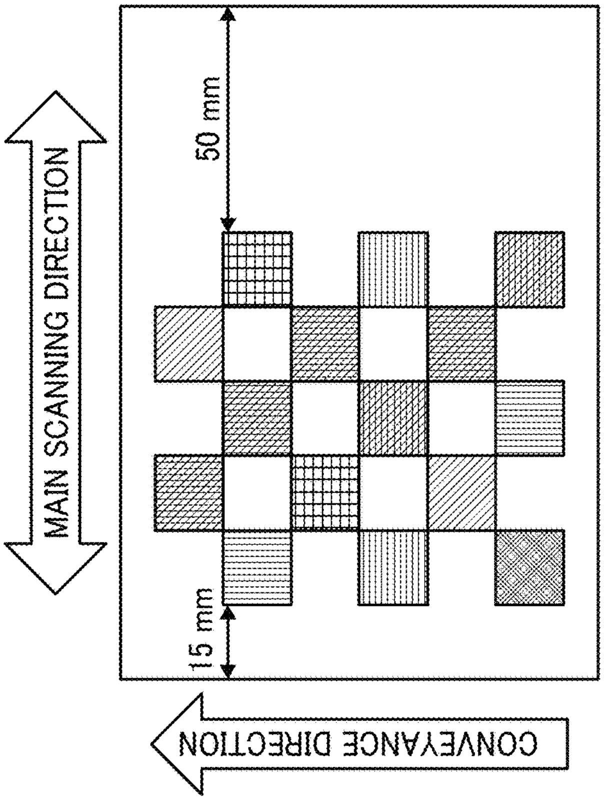

The minimum margin width is the minimum width between an end of the image and an end of the recording medium adjacent to the end of the image in a main scanning direction orthogonal to a conveyance direction in one page, as illustrated in FIGS. 8A and 8B. FIG. 8A illustrates one page having a margin width of 15 mm in one end and a margin width of 50 mm in the other end. In this case, the controller 105 determines that the minimum margin width in the one page is 15 mm. The controller 105 determines that the minimum margin width in one page illustrated in FIG. 8B is 5 mm. In the image examples of FIGS. 8A and 8B, the outer frame represents the area of one page.

In step S303, the controller 105 determines whether the maximum toner overlapping ratio on the page is 200% or more. As a result of the determination, if the maximum toner overlapping ratio on the page is 200% or more, the controller 105 makes the control flow proceed to step S304, and if the maximum toner overlapping ratio on the page is less than 200%, the controller makes the control flow proceed to step S305.

In step S304, the engine controller in FIG. 1B determines the target fixing temperature to be 160° C. in accordance with the maximum toner overlapping ratio of 200% or more on the page.

In step S305, the controller 105 determines whether the maximum toner overlapping ratio on the page is 150% or more and less than 200%. As a result of the determination, if the maximum toner overlapping ratio on the page is 150% or more, the controller 105 makes the control flow proceed to step S306, and if the maximum toner overlapping ratio on the page is less than 150%, the controller makes the control flow proceed to step S307.

In step S306, the engine controller in FIG. 1B determines the target fixing temperature to be 158° C. in accordance with the maximum toner overlapping ratio on the page that is 150% or more and less than 200%.

In step S307, the controller 105 determines whether the maximum toner overlapping ratio on the page is 100% or more and less than 150%. As a result of the determination, if the maximum toner overlapping ratio on the page is 100% or more and less than 150%, the controller 105 makes the control flow proceed to step S308, and if the maximum toner overlapping ratio on the page is less than 100%, the controller makes the control flow proceed to step S309.

In step S308, the engine controller in FIG. 1B determines the target fixing temperature to be 156° C. in accordance with the maximum toner overlapping ratio on the page that is 100% or more and less than 150%.

In step S309, the controller 105 determines whether the minimum margin width on the page is 15 mm or less. As a result of the determination, if the page has the minimum margin width equal to or smaller than 15 mm and the maximum toner overlapping ratio less than 100%, the controller 105 makes the control flow proceed to step S310, and if the page has the minimum margin width larger than 15 mm, the controller makes the control flow proceed to step S311.

In step S310, the engine controller in FIG. 1B determines the target fixing temperature to be 154° C. in accordance with the maximum toner overlapping ratio on the page that is less than 100% and the minimum margin width on the page that is 15 mm or less.

In step S311, the engine controller in FIG. 1B determines the target fixing temperature to be 152° C. in accordance with the maximum toner overlapping ratio on the page that is less than 100% and the minimum margin width on the page that is larger than 15 mm.

In step S312, the controller 105 starts printing based on the print job received from the personal computer in FIG. 1B and controlling the amount of power supplied to the heaters 183 based on the target fixing temperature determined in any one of step S304, step S306, step S308, step S310, and step S311. In other words, the controller 105 controls the fixing device to heat and fix the image onto the sheet as the recording medium after the start of printing.

The above-described target fixing temperatures set in step S304, step S306, step S308, step S310, and step S311 are examples, and the target fixing temperature may be increased or decreased according to the minimum margin width and the maximum toner overlapping ratio. The engine controller in FIG. 1B may perform the above-described temperature control of the fixing device based on the minimum margin width and the maximum toner overlapping ratio.

When the print job includes forming images on multiple sheets, the controller 105 returns to the control in step S302 and performs the above-described steps again to fix the image onto the next sheet.

A fourth embodiment is described below.

The image forming apparatus according to the third embodiment includes the controller receiving the print job, determining whether a picture image is on a page in the print job, determining the maximum toner overlapping ratio on the page in the print job, and determining the target fixing temperature based on the maximum toner overlapping ratio on the page and the determination whether the picture image is on the page before the start of forming the image. Subsequently, the controller controls the image forming section to form one or more toner images of one or more toners and controls the fixing device to heat and fix the one or more toner images onto the sheet as the recording medium at the target fixing temperature.

Figure 9:
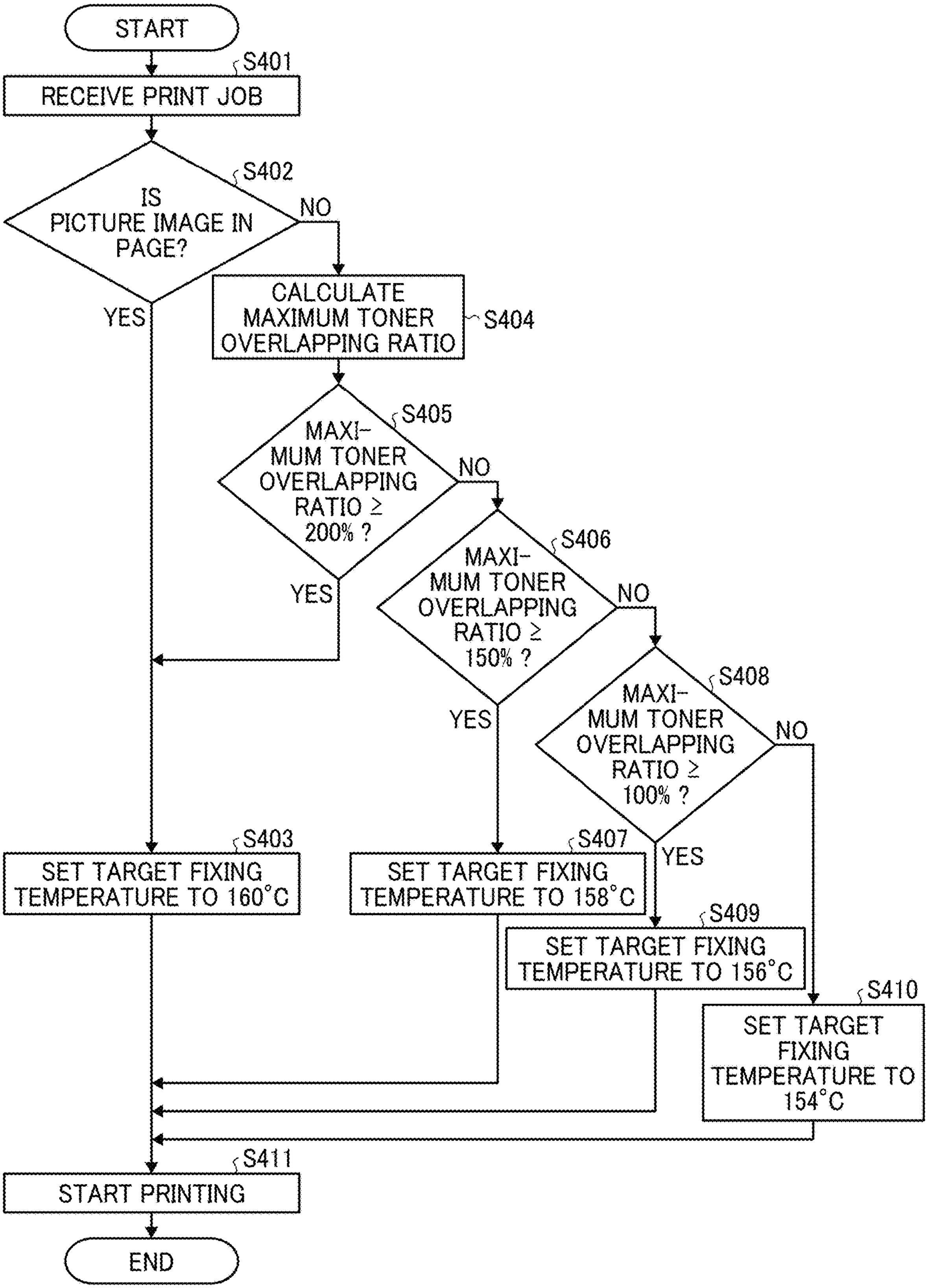
FIG. 9 is a flowchart of a control in the image forming apparatus according to a fourth embodiment.

FIG. 9 is a flowchart of a control in the image forming apparatus according to the fourth embodiment. The controller 105 in the image forming apparatus according to the fourth embodiment performs from step S401 to step S411 before the start of printing.

A control flow in the image forming apparatus according to the fourth embodiment includes determination regarding the picture image in addition to the control flow in the image forming apparatus according to the first embodiment.

In a similar manner to the processes in step S101, in step S401, the controller 105 receives the print job from the personal computer in FIG. 1B and reads image data to decompose the image data into cyan (C) image data, magenta (M) image data, yellow (Y) image data, and black (K) image data so that the image forming apparatus 100 in FIG. 1A can form the image.

In step S402, the controller 105 determines whether the picture image is on a page based on the decomposed image data. As a result of the determination, if the picture image is on the page, the controller 105 makes the control flow proceed to step S403, and if the picture image is not on the page, the controller makes the control flow proceed to step S404.

Figure 10:
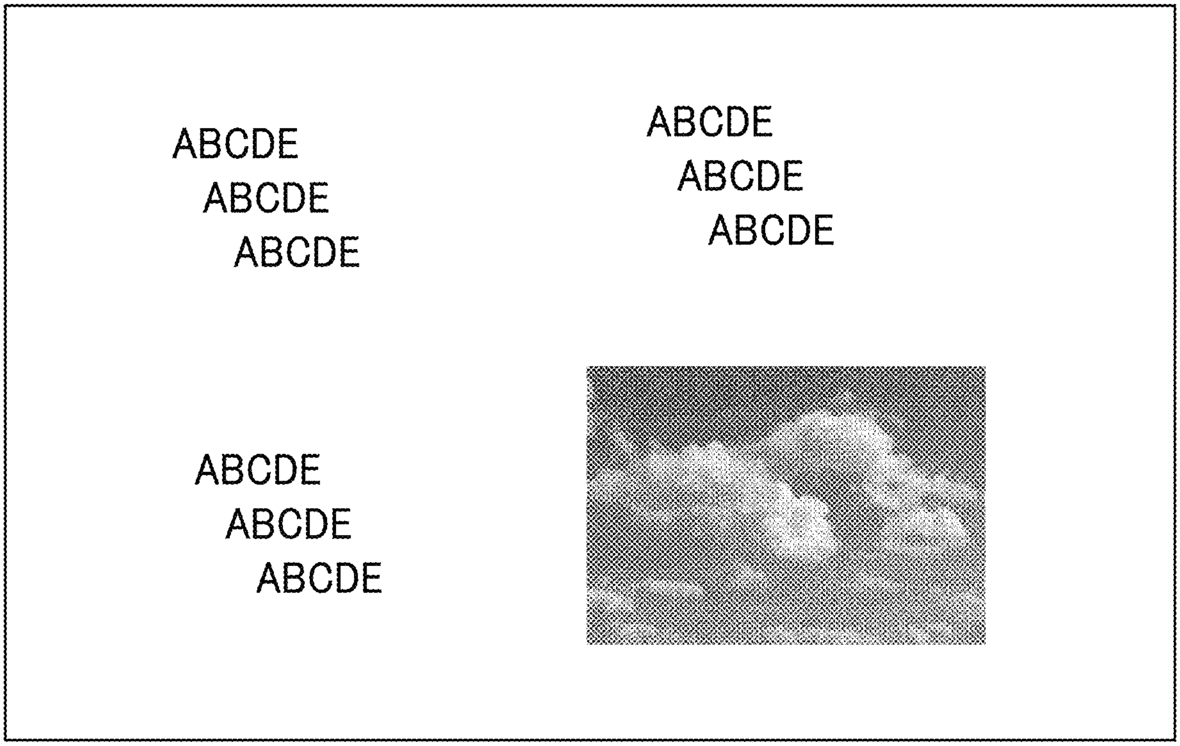
FIG. 10 is a diagram illustrating a picture image on a page.

The picture image is a photograph or an image created in a format such as BMP, GIF, TIFF, JPEG, PNG, RAW, or SVG in a part of one page and includes image data of different colors recorded in units of pixels, as illustrated in FIG. 10. Calculating the maximum toner overlapping ratio of the picture image needs decomposing the image data in units of pixels, which may impose a large load on the controller, reduce the processing speed, and reduce the printing speed.

In S403, in response to the determination that the picture image is on the page, the engine controller in FIG. 1B estimates (determines) that the maximum toner overlapping ratio on the page is 200% or more and determines the fixing target temperature to be 160° C.

In step S404, the controller 105 calculates the maximum toner overlapping ratio on the page based on the decomposed image data.

In step S405, the controller 105 determines whether the maximum toner overlapping ratio on the page is 200% or more. As a result of the determination, if the maximum toner overlapping ratio on the page is 200% or more, the controller 105 makes the control flow proceed to step S403, and if the maximum toner overlapping ratio on the page is less than 200%, the controller makes the control flow proceed to step S406.

In step S406, the controller 105 determines whether the maximum toner overlapping ratio on the page is 150% or more and less than 200%. As a result of the determination, if the maximum toner overlapping ratio on the page is 150% or more and less than 200%, the controller 105 makes the control flow proceed to step S407, and if the maximum toner overlapping ratio on the page is less than 150%, the controller makes the control flow proceed to step S408.

In step S407, the engine controller in FIG. 1B determines the target fixing temperature to be 158° C. in accordance with the maximum toner overlapping ratio on the page that is 150% or more and less than 200%.

In step S408, the controller 105 determines whether the maximum toner overlapping ratio on the page is 100% or more and less than 150%. As a result of the determination, if the maximum toner overlapping ratio on the page is 100% or more and less than 150%, the controller 105 makes the control flow proceed to step S409, and if the maximum toner overlapping ratio on the page is less than 100%, the controller makes the control flow proceed to step S410.

In step S409, the engine controller in FIG. 1B determines the target fixing temperature to be 156° C. in accordance with the maximum toner overlapping ratio on the page that is 100% or more and less than 150%.

In step S410, the engine controller in FIG. 1B determines the target fixing temperature to be 154° C. in accordance with the maximum toner overlapping ratio on the page that is less than 100%.

In step S411, the controller 105 starts printing based on the print job received from the personal computer in FIG. 1B and controlling the amount of power supplied to the heaters 183 based on the target fixing temperature determined in any one of step S403, step S407, step S409, and step S410. In other words, the controller 105 controls the fixing device to heat and fix the image onto the sheet as the recording medium after the start of printing.

The above-described target fixing temperatures set in step S403, step S407, step S409, and step S410 are examples, and the target fixing temperature may be increased or decreased according to the maximum toner overlapping ratio and the existence of the picture image. The engine controller in FIG. 1B may perform the above-described temperature control of the fixing device based on the maximum toner overlapping ratio and the determination of whether the picture image is on the page.

When the print job includes forming images on multiple sheets, the controller 105 returns to the control in step S402 and performs the above-described steps again to fix the image onto the next sheet.

A fifth embodiment is described below.

The image forming apparatus according to the fifth embodiment includes the controller receiving the print job, determining the thickness of the recording medium, determining the maximum toner overlapping ratio on the page in the print job, and determining the target fixing temperature based on the thickness (the basis weight) of the recording medium and the maximum toner overlapping ratio on the page before the start of forming the image. Subsequently, the controller controls the image forming section to form one or more toner images of one or more toners and controls the fixing device to heat and fix the one or more toner images onto the sheet as the recording medium at the target fixing temperature.

Figure 11:
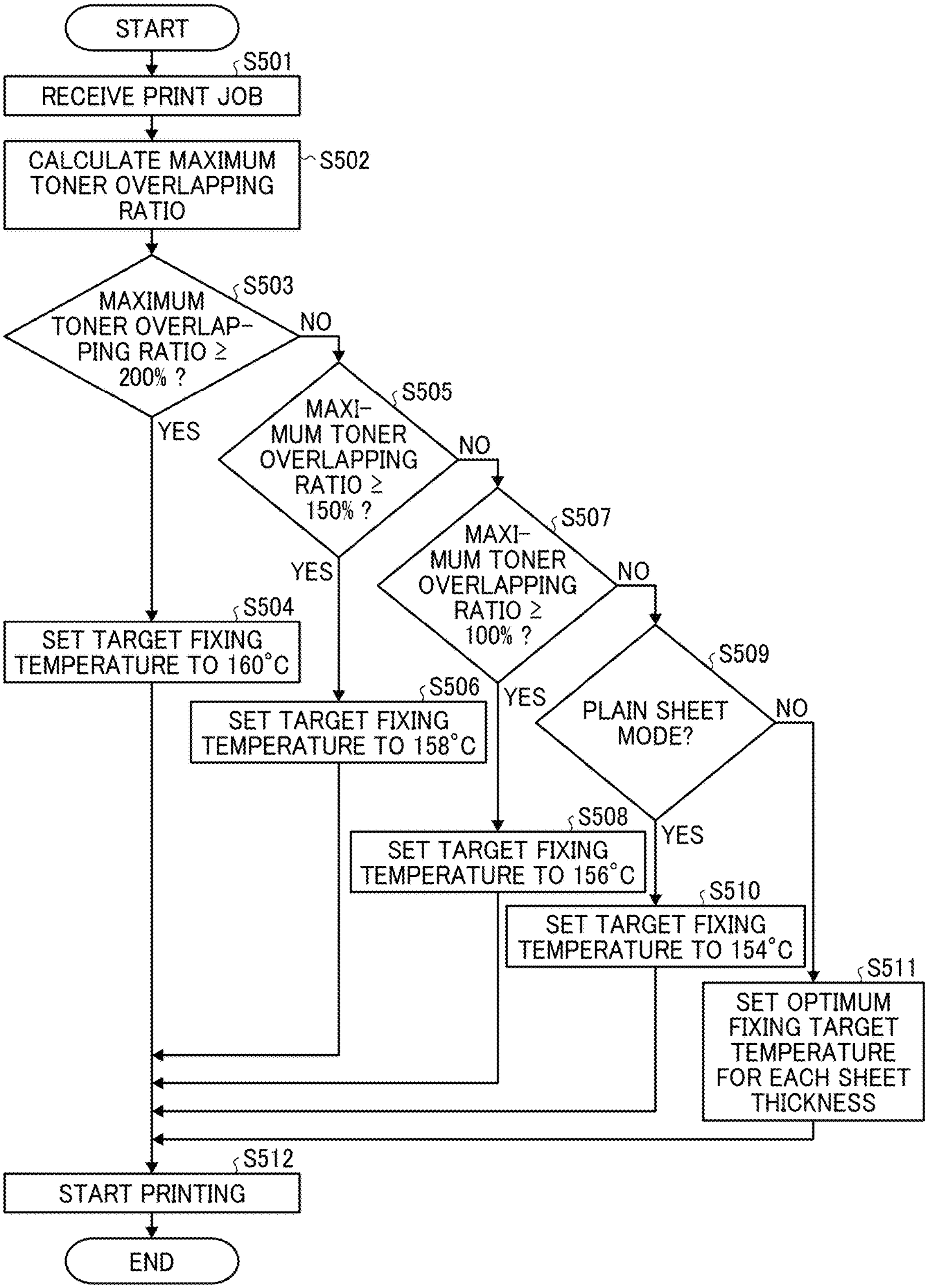
FIG. 11 is a flowchart of a control in the image forming apparatus according to a fifth embodiment.

FIG. 11 is a flowchart of a control in the image forming apparatus according to the fifth embodiment. The controller 105 in the image forming apparatus according to the fifth embodiment performs from step S501 to step S512 before the start of printing.

A control flow in the image forming apparatus according to the fifth embodiment includes the determination of whether a plain-sheet mode is set in addition to the control flow in the image forming apparatus according to the first embodiment. Plain sheets are most frequently printed by the image forming apparatus. The plain sheet has a thickness with a basis weight of 50 to 90 $g/m^2$. In many image forming apparatuses, the target fixing temperature to fix the toner onto the sheet having a thickness different from the thickness of the plain sheet is different from the target fixing temperature to fix the toner onto the plain sheet. In a mode other than the plain-sheet mode, the controller does not change the target fixing temperature from an optimum fixing target temperature set for each sheet thickness, even when the toner overlapping ratio is less than 100%.

In a similar manner to the processes in step S101, in step S501, the controller 105 receives the print job from the personal computer in FIG. 1B and reads image data to decompose the image data into cyan (C) image data, magenta (M) image data, yellow (Y) image data, and black (K) image data so that the image forming apparatus 100 in FIG. 1A can form the image.

In step S502, the controller 105 calculates the maximum toner overlapping ratio on the page based on the decomposed image data.

In step S503, the controller 105 determines whether the maximum toner overlapping ratio on the page is 200% or more. As a result of the determination, if the maximum toner overlapping ratio on the page is 200% or more, the controller 105 makes the control flow proceed to step S504, and if the maximum toner overlapping ratio on the page is less than 200%, the controller makes the control flow proceed to step S505.

In step S504, the engine controller in FIG. 1B determines the target fixing temperature to be 160° C. in accordance with the maximum toner overlapping ratio of 200% or more on the page.

In step S505, the controller 105 determines whether the maximum toner overlapping ratio on the page is 150% or more and less than 200%. As a result of the determination, if the maximum toner overlapping ratio on the page is 150% or more, the controller 105 makes the control flow proceed to step S506, and if the maximum toner overlapping ratio on the page is less than 150%, the controller makes the control flow proceed to step S507.

In step S506, the engine controller in FIG. 1B determines the target fixing temperature to be 158° C. in accordance with the maximum toner overlapping ratio on the page that is 150% or more and less than 200%.

In step S507, the controller 105 determines whether the maximum toner overlapping ratio on the page is 100% or more and less than 150%. As a result of the determination, if the maximum toner overlapping ratio on the page is 100% or more and less than 150%, the controller 105 makes the control flow proceed to step S508, and if the maximum toner overlapping ratio on the page is less than 100%, the controller makes the control flow proceed to step S509.

In step S508, the engine controller in FIG. 1B determines the target fixing temperature to be 156° C. in accordance with the maximum toner overlapping ratio on the page that is 100% or more and less than 150%.

In step S509, the controller 105 determines whether the recording medium is the plain sheet. As a result of the determination, if the recording medium is the plain sheet, the controller 105 makes the control flow proceed to step S510, and if the recording medium is not the plain sheet, the controller makes the control flow proceed to step S511.

In step S510, the engine controller in FIG. 1B determines the target fixing temperature to be 154° C. in accordance with the determination that the recording medium is the plain sheet.

In step S511, the engine controller in FIG. 1B determines the target fixing temperature to be the optimum fixing target temperature for each sheet thickness in accordance with the determination that the recording medium is not the plain sheet.

In step S512, the controller 105 starts printing based on the print job received from the personal computer in FIG. 1B and controlling the amount of power supplied to the heaters 183 based on the target fixing temperature determined in any one of step S504, step S506, step S508, step S510, and step S511. In other words, the controller 105 controls the fixing device to heat and fix the image onto the sheet as the recording medium after the start of printing.

The above-described target fixing temperatures set in step S504, step S506, step S508, step S510, and step S511 are examples, and the target fixing temperature may be increased or decreased according to the sheet thickness and the maximum toner overlapping ratio. The engine controller in FIG. 1B may perform the above-described temperature control of the fixing device based on the sheet thickness and the maximum toner overlapping ratio.

When the print job includes forming images on multiple sheets, the controller 105 returns to the control in step S502 and performs the above-described steps again to fix the image onto the next sheet.

A sixth embodiment is described below.

The image forming apparatus according to the sixth embodiment includes the controller receiving the print job, determining the size of the recording medium, determining the maximum toner overlapping ratio on the page in the print job, and determining the target fixing temperature based on the size of the recording medium and the maximum toner overlapping ratio on the page before the start of forming the image. Subsequently, the controller controls the image forming section to form one or more toner images of one or more toners and controls the fixing device to heat and fix the one or more toner images onto the sheet as the recording medium at the target fixing temperature.

Figure 12:
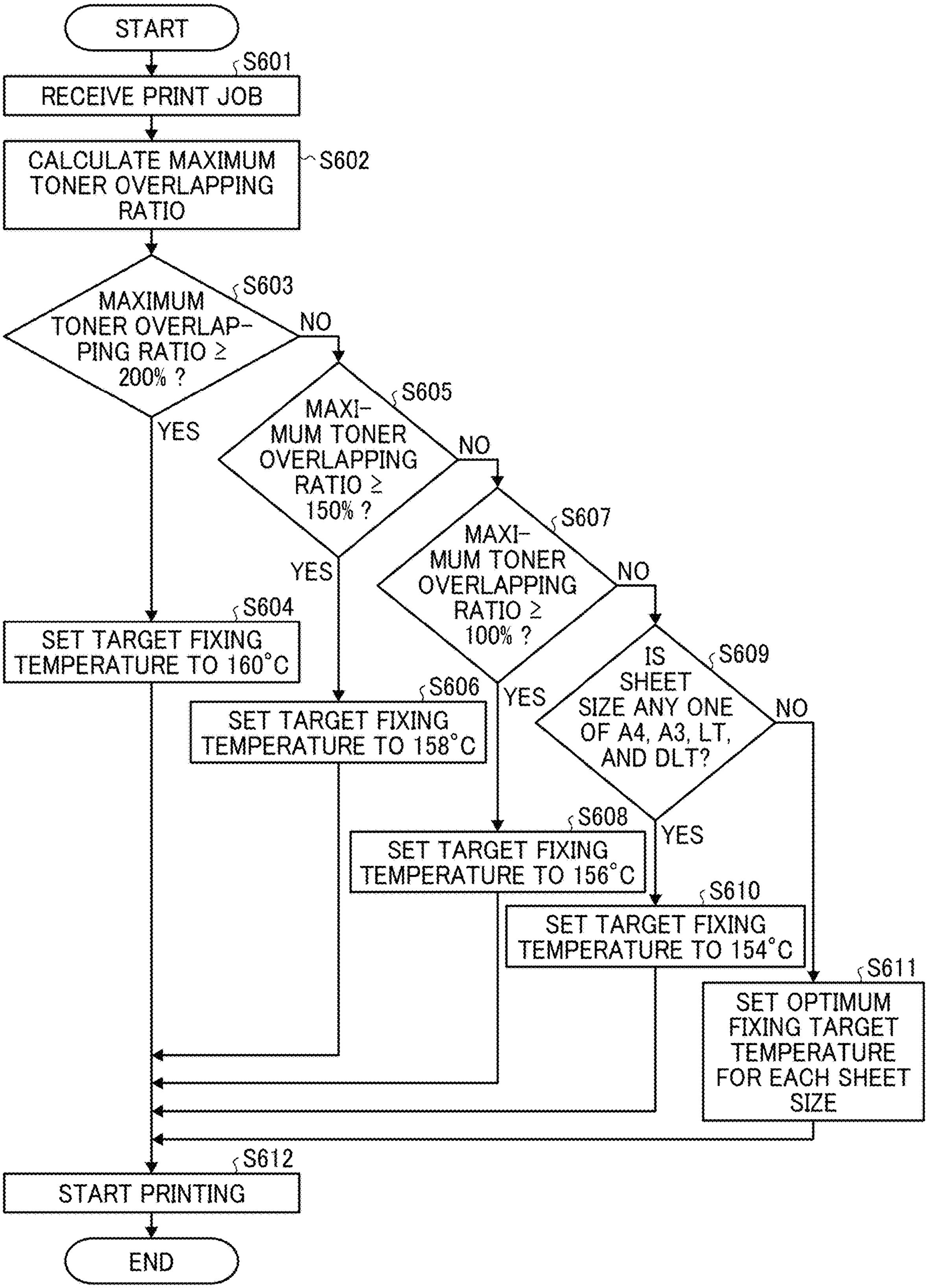
FIG. 12 is a flowchart of a control in the image forming apparatus according to a sixth embodiment.

FIG. 12 is a flowchart of a control in the image forming apparatus according to the sixth embodiment. The controller 105 in the image forming apparatus according to the sixth embodiment performs from step S601 to step S612 before the start of printing.

A control flow in the image forming apparatus according to the sixth embodiment includes the determination of the size of the sheet in addition to the control flow in the image forming apparatus according to the first embodiment. Sheets having A4 size, LT size, A3 size, and DLT size are most frequently printed by the image forming apparatus. There is an image forming apparatus that changes the fixing temperature control method when the fixing device fixes the toner onto the sheet having a size different from A4 size, LT size, A3 size, and DLT size. When the image forming apparatus prints an image on the sheet having a size different from A4 size, LT size, A3 size, and DLT size, the controller does not change the target fixing temperature from an optimum fixing target temperature set for each sheet size, even when the toner overlapping ratio is less than 100%.

In a similar manner to the processes in step S101, in step S601, the controller 105 receives the print job from the personal computer in FIG. 1B and reads image data to decompose the image data into cyan (C) image data, magenta (M) image data, yellow (Y) image data, and black (K) image data so that the image forming apparatus 100 in FIG. 1A can form the image.

In step S602, the controller 105 calculates the maximum toner overlapping ratio on the page based on the decomposed image data.

In step S603, the controller 105 determines whether the maximum toner overlapping ratio on the page is 200% or more. As a result of the determination, if the maximum toner overlapping ratio on the page is 200% or more, the controller 105 makes the control flow proceed to step S604, and if the maximum toner overlapping ratio on the page is less than 200%, the controller makes the control flow proceed to step S605.

In step S604, the engine controller in FIG. 1B determines the target fixing temperature to be 160° C. in accordance with the maximum toner overlapping ratio of 200% or more on the page.

In step S605, the controller 105 determines whether the maximum toner overlapping ratio on the page is 150% or more and less than 200%. As a result of the determination, if the maximum toner overlapping ratio on the page is 150% or more, the controller 105 makes the control flow proceed to step S606, and if the maximum toner overlapping ratio on the page is less than 150%, the controller makes the control flow proceed to step S607.

In step S606, the engine controller in FIG. 1B determines the target fixing temperature to be 158° C. in accordance with the maximum toner overlapping ratio on the page that is 150% or more and less than 200%.

In step S607, the controller 105 determines whether the maximum toner overlapping ratio on the page is 100% or more and less than 150%. As a result of the determination, if the maximum toner overlapping ratio on the page is 100% or more and less than 150%, the controller 105 makes the control flow proceed to step S608, and if the maximum toner overlapping ratio on the page is less than 100%, the controller makes the control flow proceed to step S609.

In step S608, the engine controller in FIG. 1B determines the target fixing temperature to be 156° C. in accordance with the maximum toner overlapping ratio on the page that is 100% or more and less than 150%.

In step S609, the controller 105 determines whether the size of the recording medium is any one of A4 size, LT size, A3 size, and DLT size. As a result of the determination, if the size of the recording medium is any one of A4 size, LT size, A3 size, and DLT size, the controller 105 makes the control flow proceed to step S610, and if the size of the recording medium is not any one of A4 size, LT size, A3 size, the controller makes the control flow proceed to step S611.

In step S610, the engine controller in FIG. 1B determines the target fixing temperature to be 154° C. in accordance with the determination that the size of the recording medium is any one of A4 size, LT size, A3 size, and DLT size.

In step S611, the engine controller in FIG. 1B determines the target fixing temperature to be the optimum fixing target temperature for each sheet size in accordance with the determination that the size of the recording medium is not any one of A4 size, LT size, A3 size, and DLT size.

In step S612, the controller 105 starts printing based on the print job received from the personal computer in FIG. 1B and controlling the amount of power supplied to the heaters 183 based on the target fixing temperature determined in any one of step S604, step S606, step S608, step S610, and step S611. In other words, the controller 105 controls the fixing device to heat and fix the image onto the sheet as the recording medium after the start of printing.

When the print job includes forming images on multiple sheets, the controller 105 returns to the control in step S602 and performs the above-described steps again to fix the image onto the next sheet.

The above-described target fixing temperatures set in step S604, step S606, step S608, step S610, and step S611 are examples, and the target fixing temperature may be increased or decreased according to the sheet size and the maximum toner overlapping ratio. The engine controller in FIG. 1B may perform the above-described temperature control of the fixing device based on the sheet size and the maximum toner overlapping ratio. In the above description, the engine controller included in the controller executes the above-described control, but another part of the controller may execute the above-described control. According to any one of the above-described embodiments, the energy saving performance is enhanced, and the generation amount of the fine particles and the curling amount of the recording medium are reduced.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application-specific integrated circuits (ASICs), field-programmable gate arrays (FPGAs), and/or combinations thereof which are configured or programmed, using one or more programs stored in one or more memories, to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein which is programmed or configured to carry out the recited functionality.

There is a memory that stores a computer program which includes computer instructions. These computer instructions provide the logic and routines that enable the hardware (e.g., processing circuitry or circuitry) to perform the method disclosed herein. This computer program can be implemented in known formats as a computer-readable storage medium, a computer program product, a memory device, a record medium such as a CD-ROM or DVD, and/or the memory of an FPGA or ASIC.

The invention claimed is:

1. An image forming apparatus comprising:
- an image forming section to form one or more toner images of one or more toners on a recording medium;
- a fixing device to:
  - heat the one or more toner images and the recording medium based on a target fixing temperature; and
  - fix the one or more toner images onto the recording medium; and
- circuitry configured to:
  - receive a print job;
  - determine whether a picture image is on a page in the print job;
  - in response to a determination that the picture image is on the page, estimating a maximum toner overlapping ratio to be a predetermined value; and
  - in response to a determination that the picture image is not on the page, calculating the maximum toner overlapping ratio;
  - determine a target fixing temperature of the fixing device in accordance with the estimated maximum toner overlapping ratio or the calculated maximum toner overlapping ratio;
  - control the image forming section to form the one or more toner images; and
  - control the fixing device to heat and fix the one or more toner images on the recording medium at the target fixing temperature determined based on the estimated maximum toner overlapping ratio or the calculated maximum toner overlapping ratio.

2. The image forming apparatus according to claim 1, wherein the circuitry is further configured to:
- calculate an image area rate on the page in the print job;
- determine the target fixing temperature in accordance with the estimated maximum toner overlapping ratio or the calculated maximum toner overlapping ratio and the image area rate;
- control the image forming section to form the one or more toner images; and
- control the fixing device to heat and fix the one or more toner images on the recording medium at the target fixing temperature determined based on the estimated maximum toner overlapping ratio or the calculated maximum toner overlapping ratio.

3. The image forming apparatus according to claim 1, wherein the circuitry is further configured to:

calculate a minimum margin width on the page in the print job;

determine the target fixing temperature in accordance with the estimated maximum toner overlapping ratio or the calculated maximum toner overlapping ratio and the minimum margin width;

control the image forming section to form the one or more toner images; and control the fixing device to heat and fix the one or more toner images on the recording medium at the target fixing temperature determined based on the estimated maximum toner overlapping ratio or the calculated maximum toner overlapping ratio.

4. The image forming apparatus according to claim 1, wherein the circuitry is further configured to:

determine a thickness of the recording medium;

determine the target fixing temperature in accordance with the estimated maximum toner overlapping ratio or the calculated maximum toner overlapping ratio and the thickness of the recording medium;

control the image forming section to form the one or more toner images; and control the fixing device to heat and fix the one or more toner images on the recording medium at the target fixing temperature determined based on the estimated maximum toner overlapping ratio or the calculated maximum toner overlapping ratio.

5. The image forming apparatus according to claim 1, wherein the circuitry is further configured to:

determine a size of the recording medium;

determine the target fixing temperature in accordance with the estimated maximum toner overlapping ratio or the calculated maximum toner overlapping ratio and the size of the recording medium;

control the image forming section to form the one or more toner images; and control the fixing device to heat and fix the one or more toner images on the recording medium at the target fixing temperature determined based on the estimated maximum toner overlapping ratio or the calculated maximum toner overlapping ratio.

6. The image forming apparatus according to claim 1, wherein:

the image forming section includes an intermediate transfer belt wound around a plurality of support rollers including a secondary transfer facing roller, a tension roller, and an entrance roller.

7. The image forming apparatus according to claim 1, wherein:

the fixing device includes an endless fixing belt and a pressure roller that is an elastic roller comprising a cored bar covered by an elastic rubber layer.

8. The image forming apparatus according to claim 7, wherein:

the fixing device further includes a nip forming plate disposed in contact with an inner circumferential surface of the fixing belt to form a fixing nip between the pressure roller and the fixing belt.

9. The image forming apparatus according to claim 8, further comprising:

a stay to support the nip forming plate and a reflector disposed between a heater and the stay.

10. The image forming apparatus according to claim 8, further comprising:

a slide aid sheet interposed between a nip forming surface of the nip forming plate and the inner circumferential surface of the fixing belt.

11. The image forming apparatus according to claim 7, wherein:

the elastic rubber layer of the pressure roller is made of a sponge rubber.

12. The image forming apparatus according to claim 1, further comprising:

a thermopile to detect a surface temperature of a fixing belt, wherein the circuitry determines power supply to a heater based on a difference between the target fixing temperature and the detected surface temperature.

13. The image forming apparatus according to claim 1, wherein:

the image forming section comprises four photoconductors corresponding to black, cyan, magenta, and yellow toners, respectively.

14. The image forming apparatus according to claim 13, further comprising:

four primary transfer rollers, each disposed opposite one of the four photoconductors via an intermediate transfer belt.

15. The image forming apparatus according to claim 1, further comprising:

a secondary transfer roller disposed facing a secondary transfer facing roller to form a secondary transfer nip through which the recording medium is conveyed.

16. The image forming apparatus according to claim 1, further comprising:

a scanner including a carriage movable in a horizontal direction and a light source disposed in the carriage to irradiate a document through a platen.

17. The image forming apparatus according to claim 16, wherein:

the scanner further includes a photoelectric converter to receive light from the document and convert the light into electrical signals.

18. The image forming apparatus according to claim 1, further comprising:

an automatic document feeder including a document feed tray, a pickup roller, and a sheet ejection tray.

19. The image forming apparatus according to claim 1, wherein:

the image forming section includes a belt cleaner to remove transfer residual toner from an intermediate transfer belt after a toner image is transferred onto the recording medium.

* * * * *